Oct. 1, 1940.  R. L. EWALD ET AL  2,216,165
METHOD OF AND APPARATUS FOR PITTING FRUIT
Original Filed Jan. 17, 1938  21 Sheets-Sheet 4

Inventors:
Raymond L. Ewald
Henry A. Skog
By:- Cox & Moore
attys.

Oct. 1, 1940.   R. L. EWALD ET AL   2,216,165
METHOD OF AND APPARATUS FOR PITTING FRUIT
Original Filed Jan. 17, 1938   21 Sheets-Sheet 6

Inventors
Raymond L. Ewald
Henry A. Skog
By: Cox & Moore
attys.

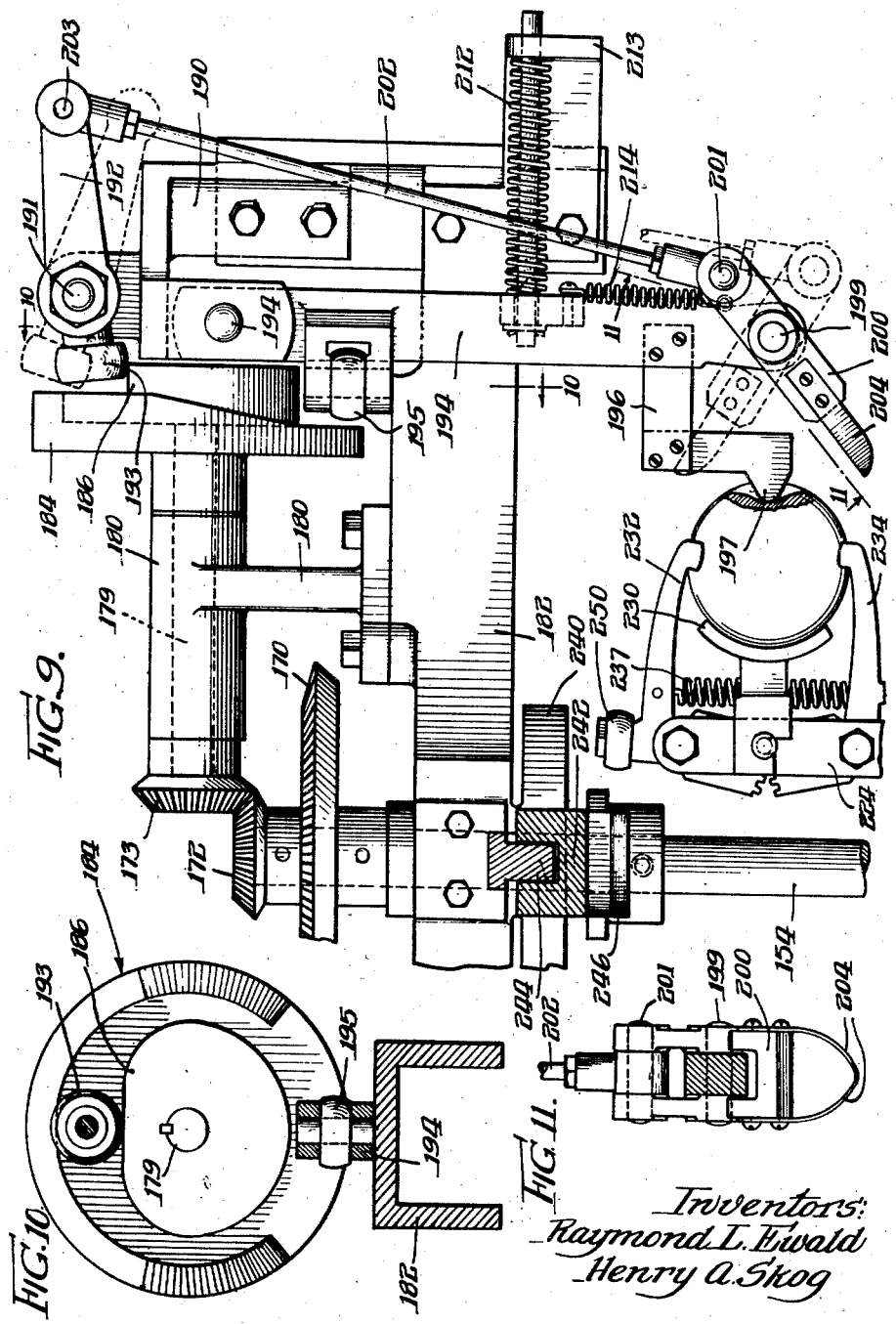

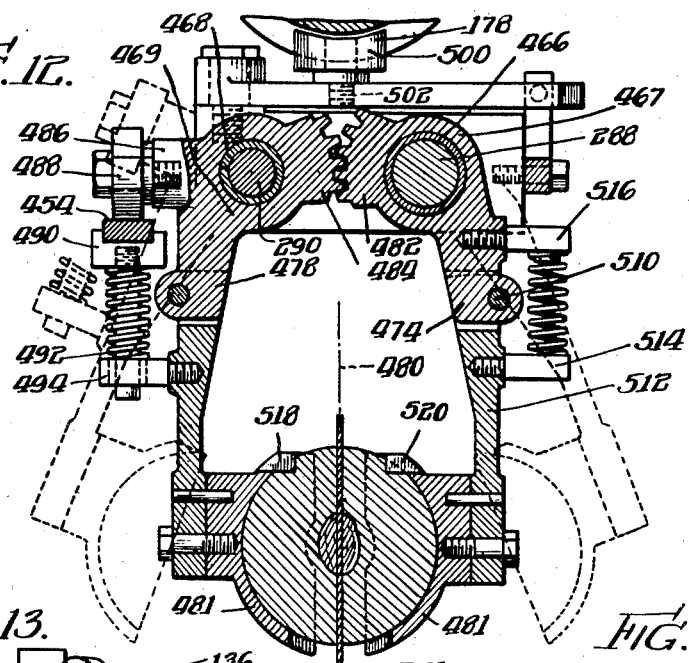
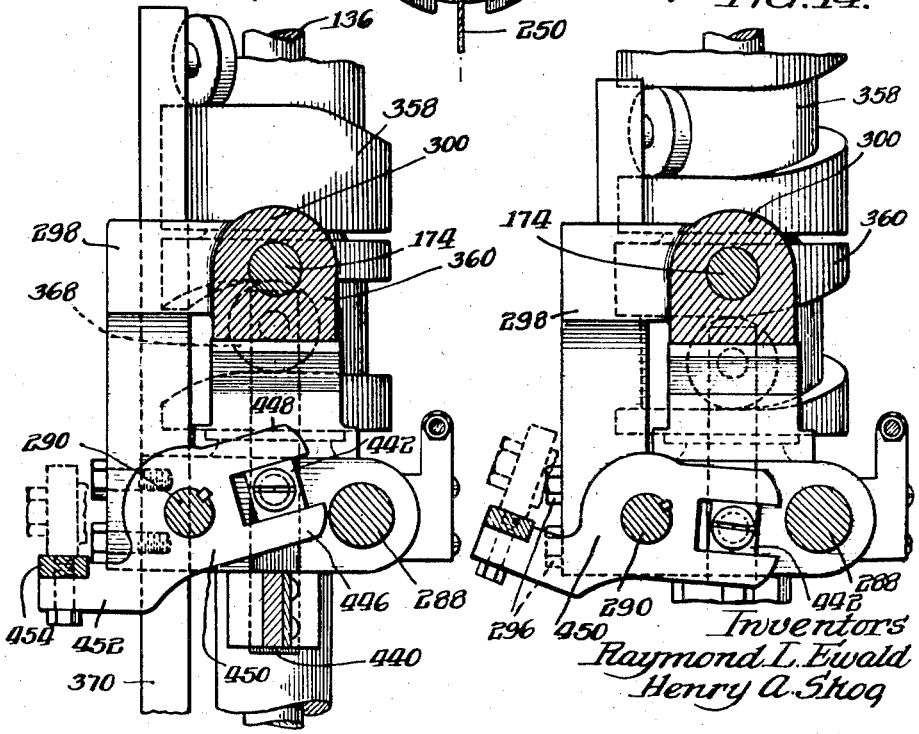

Oct. 1, 1940.          R. L. EWALD ET AL          2,216,165
METHOD OF AND APPARATUS FOR PITTING FRUIT
Original Filed Jan. 17, 1938      21 Sheets-Sheet 9

Inventors:-
Raymond L. Ewald
Henry A. Skoa
By:- Cox & Moore
attys'

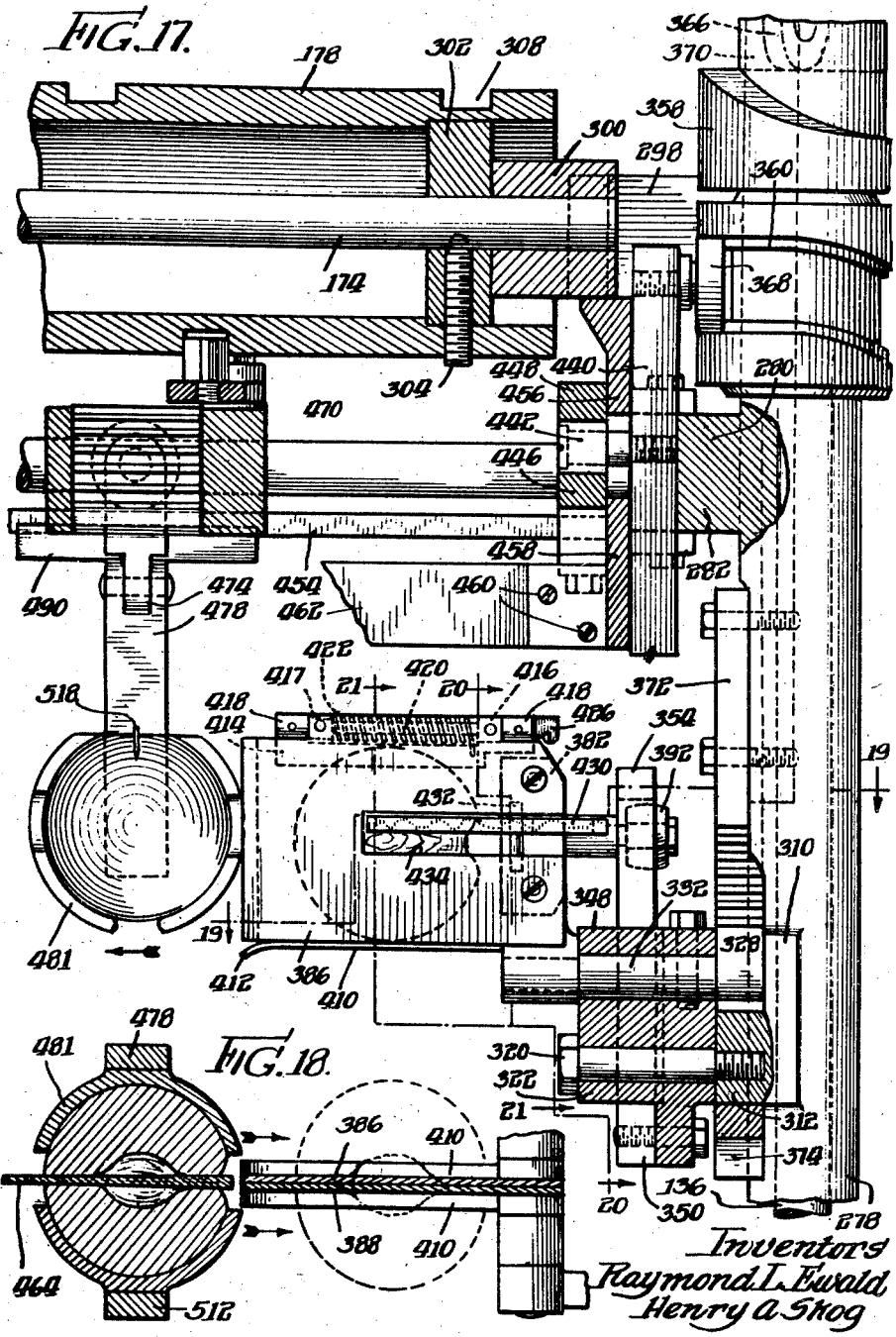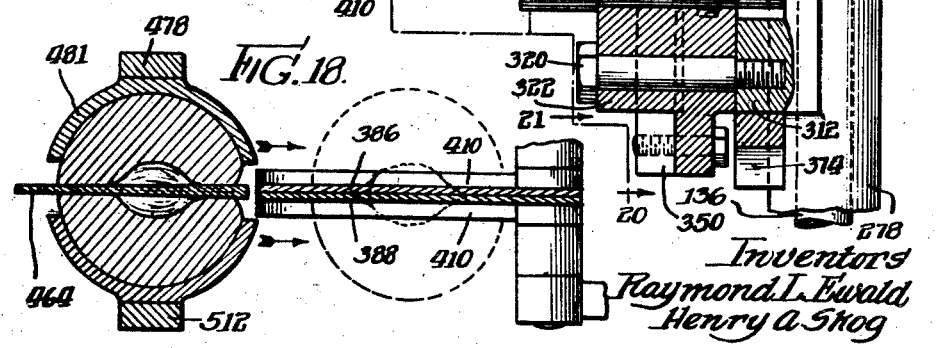

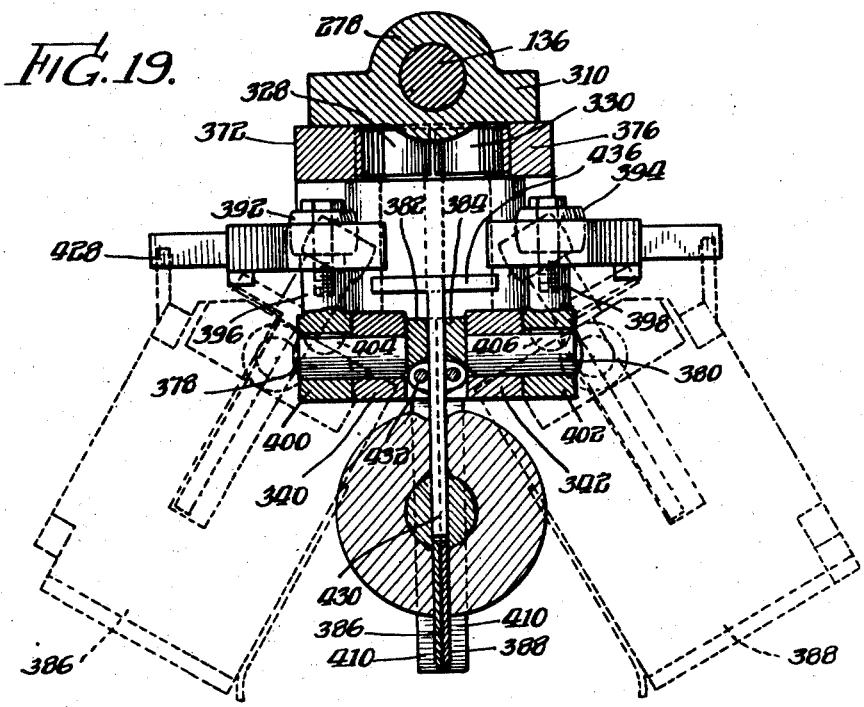
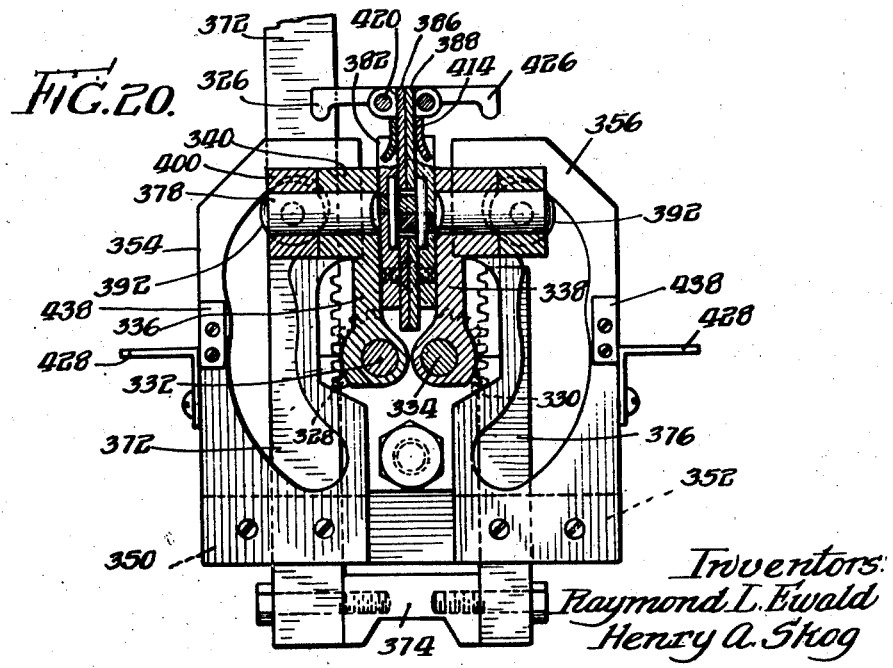

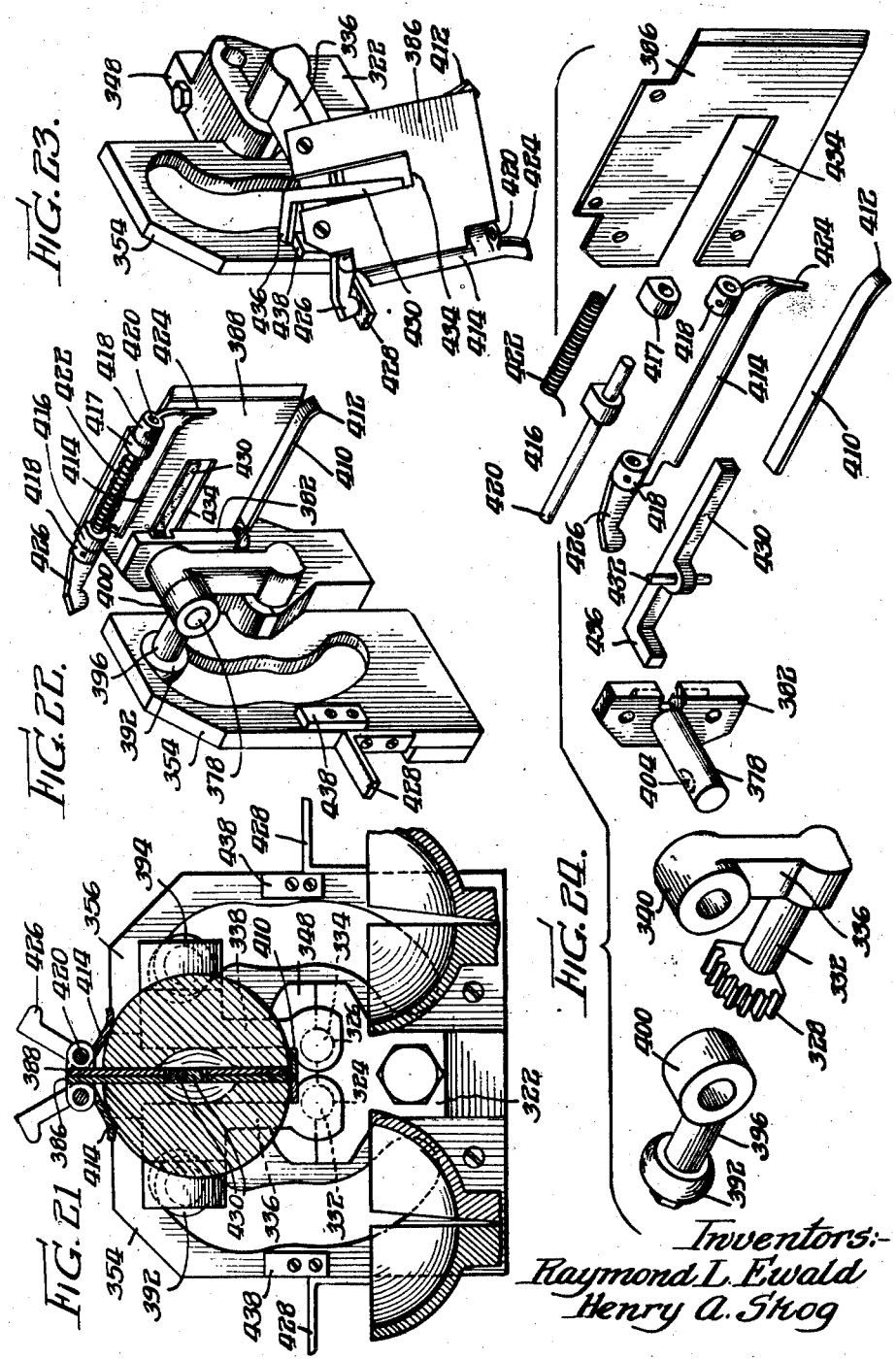

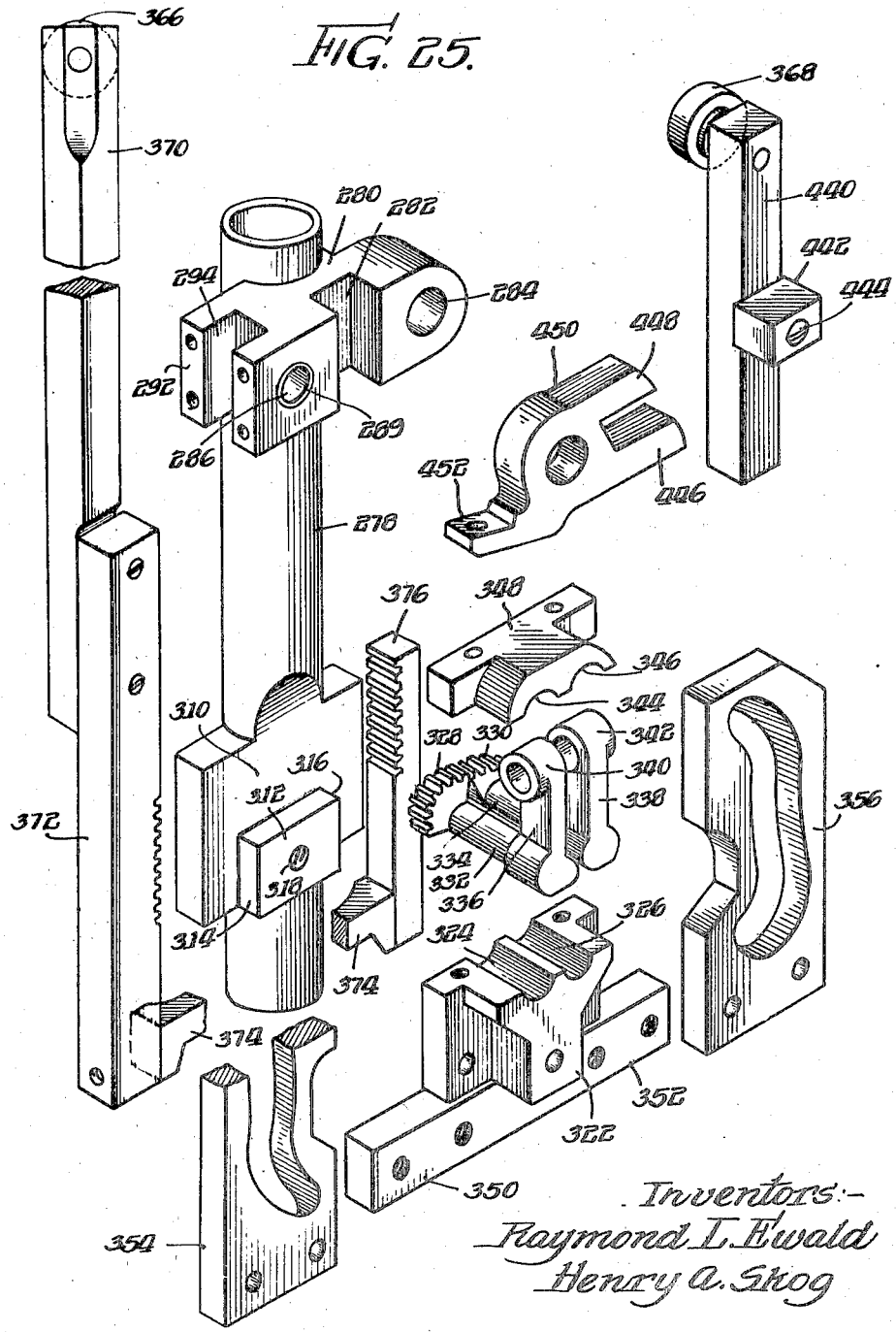

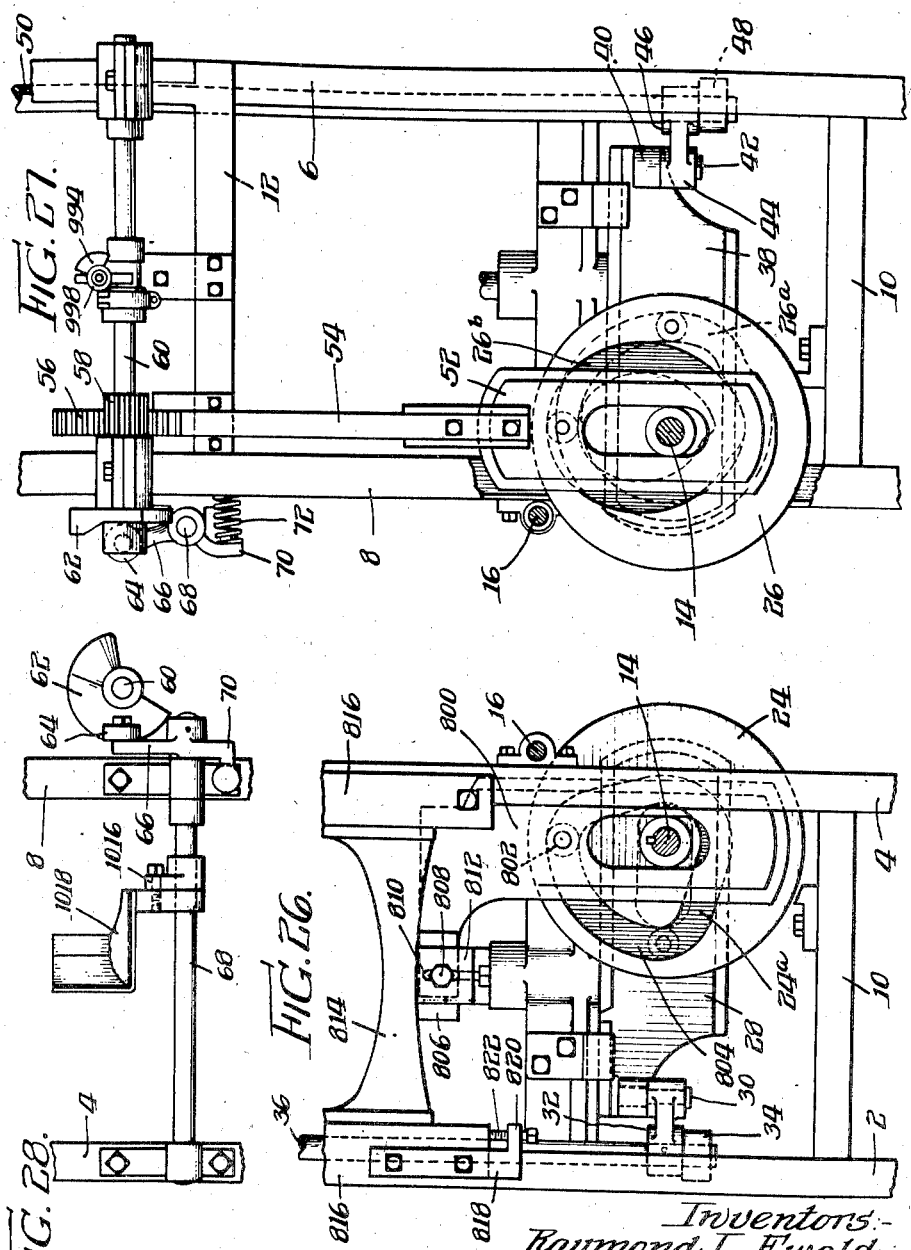

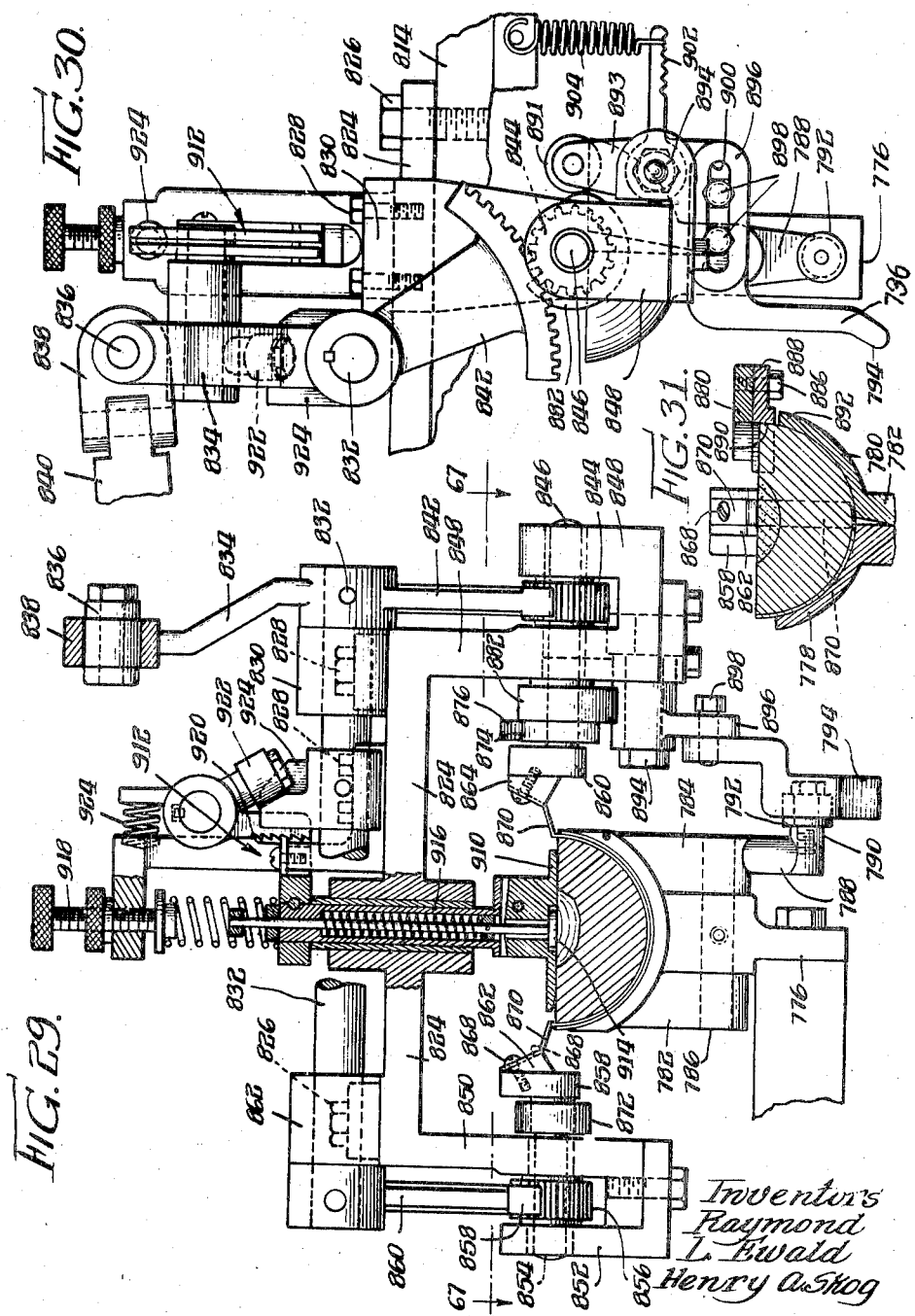

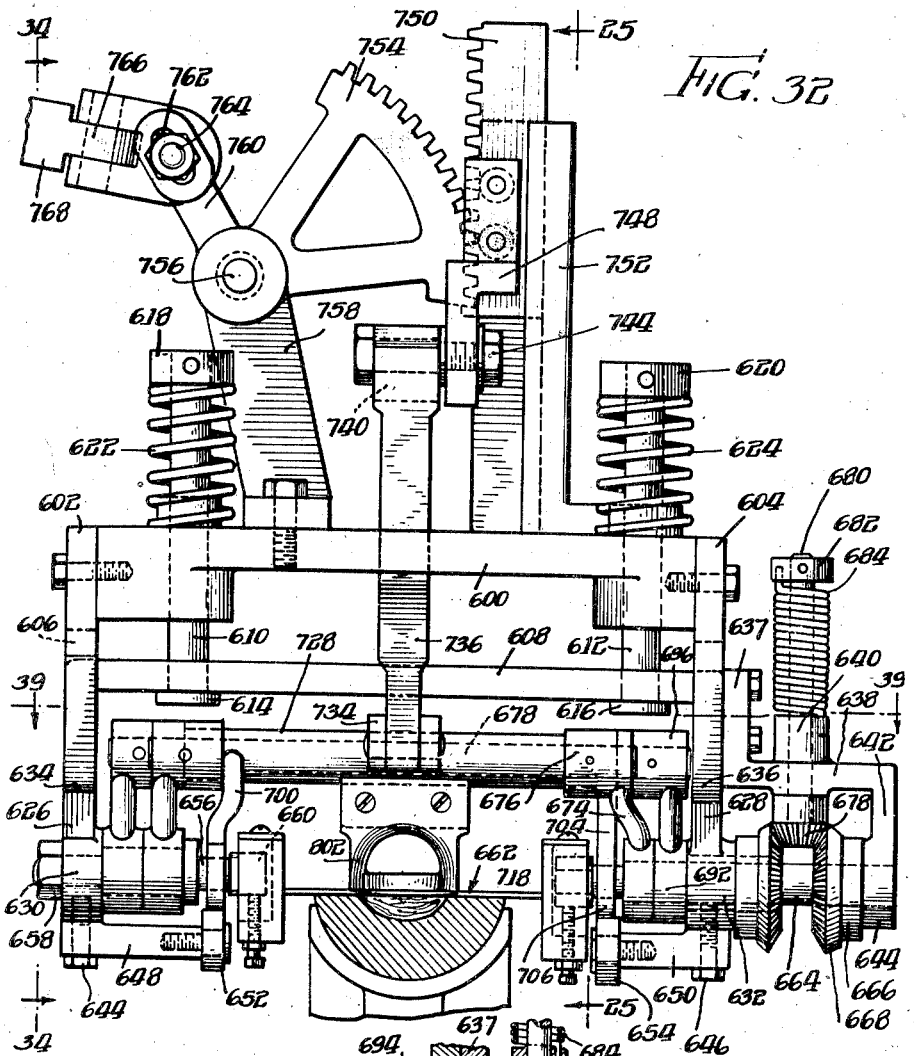
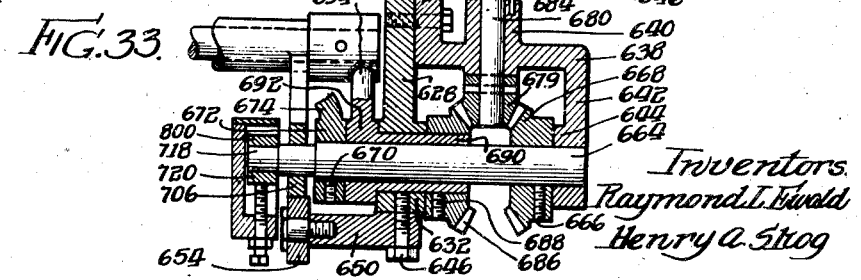

Oct. 1, 1940.　　　R. L. EWALD ET AL　　　2,216,165
METHOD OF AND APPARATUS FOR PITTING FRUIT
Original Filed Jan. 17, 1938　　21 Sheets-Sheet 17
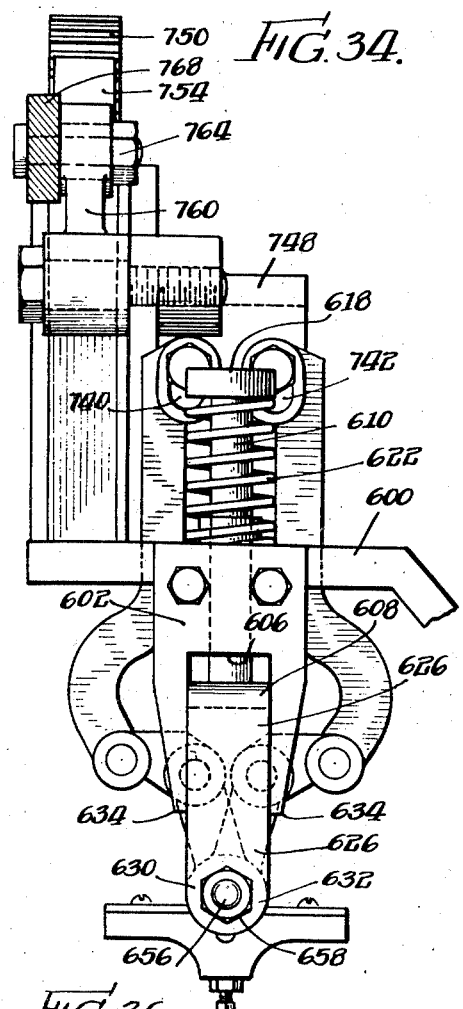
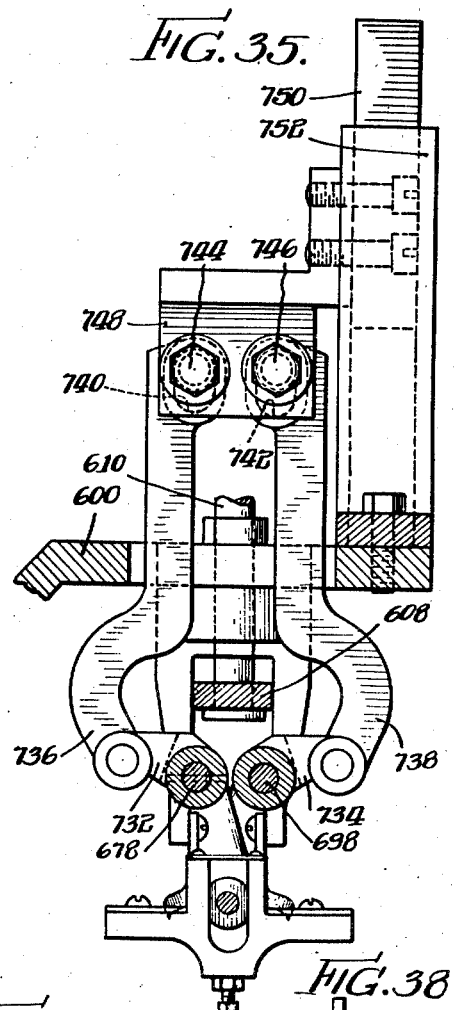
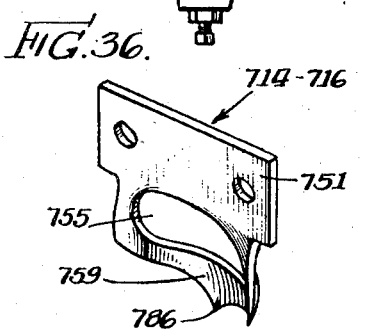
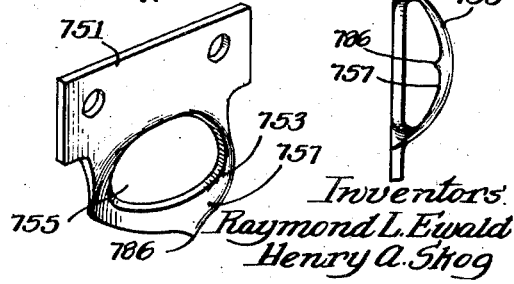
Inventors
Raymond L. Ewald
Henry A. Shog
By:- Cox & Moore
Attys

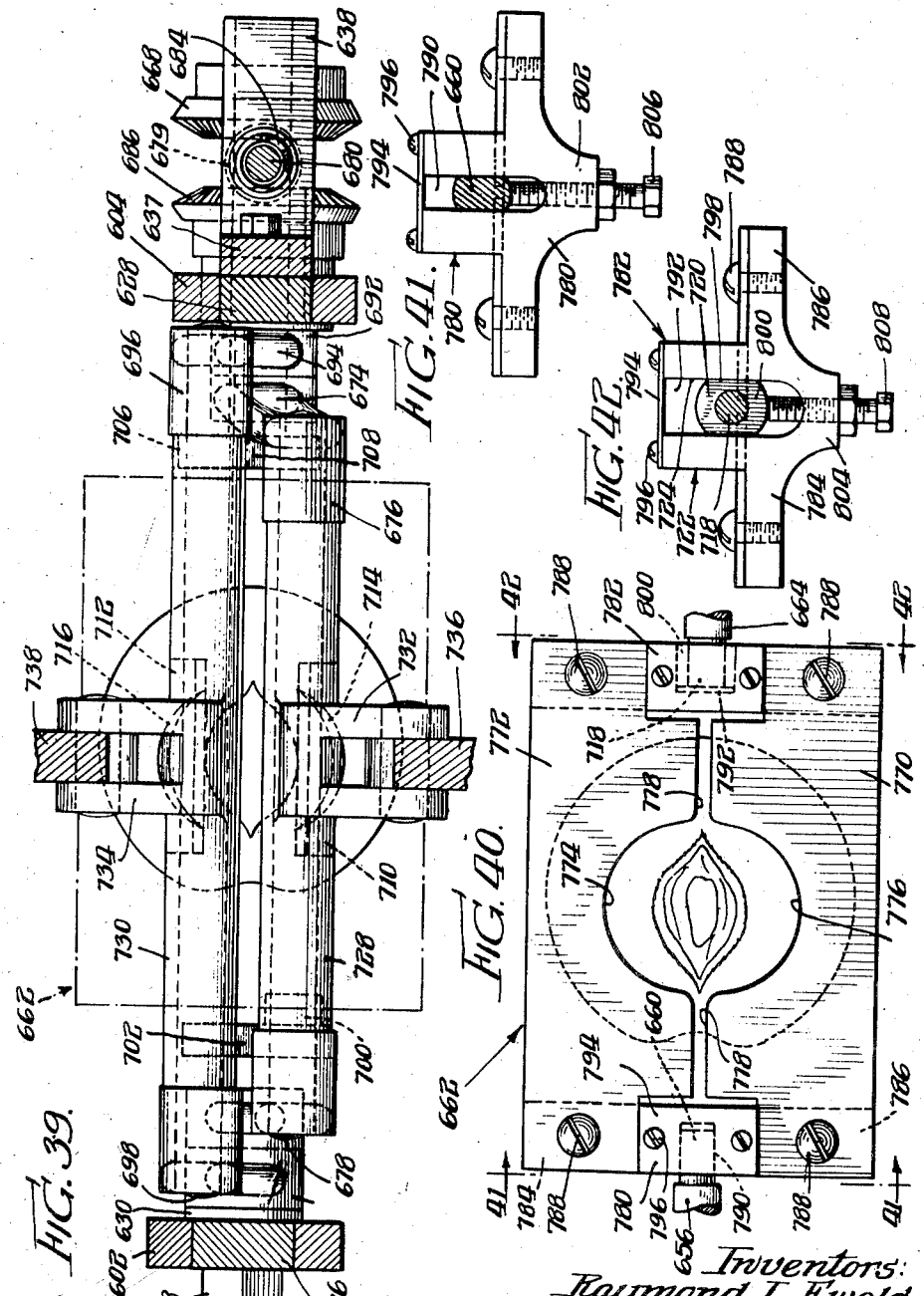

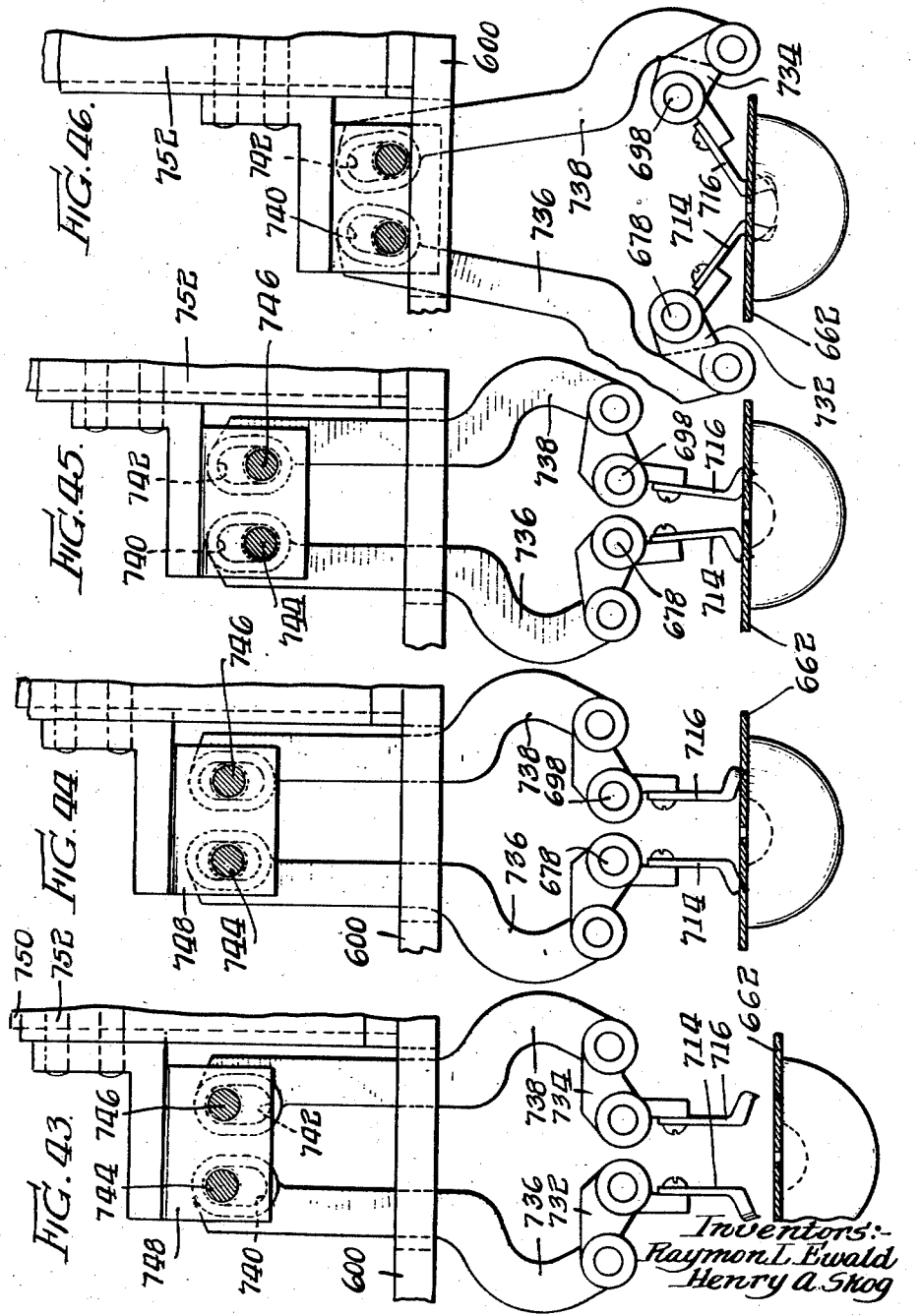

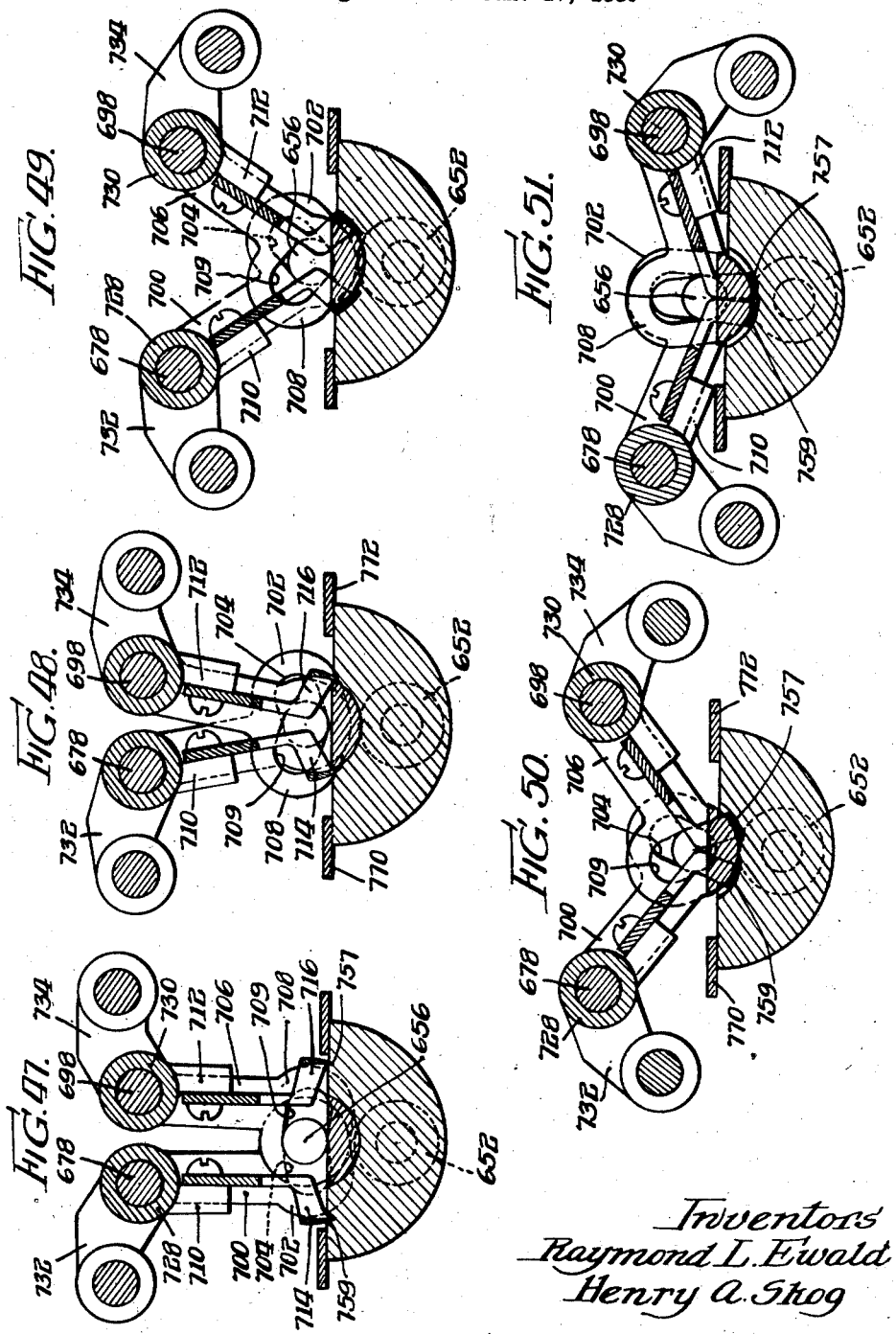

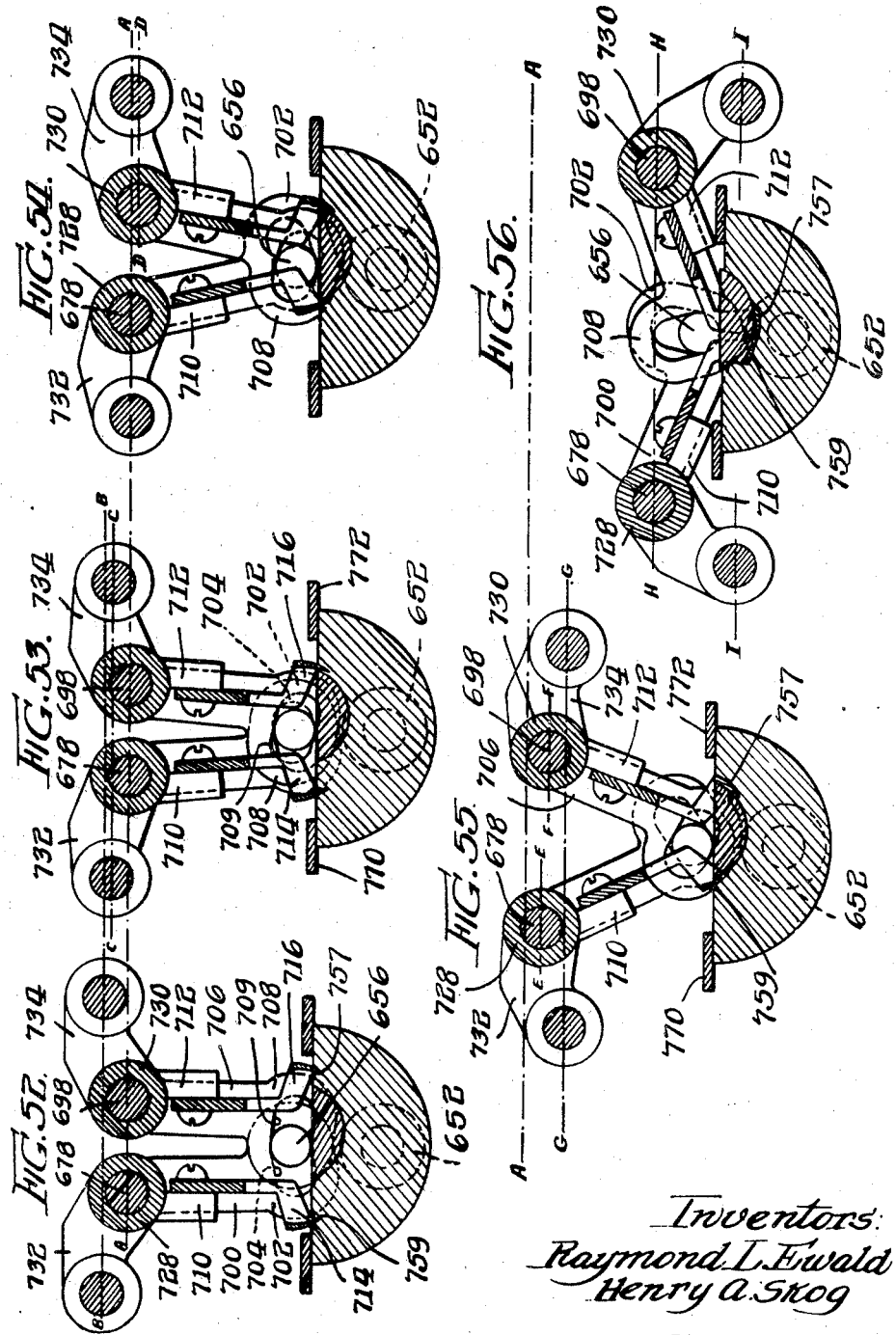

Patented Oct. 1, 1940

2,216,165

UNITED STATES PATENT OFFICE 2,216,165

METHOD OF AND APPARATUS FOR PITTING FRUIT

Raymond L. Ewald and Henry A. Skog, Olympia, Wash., assignors to Special Equipment Company, Portland, Oreg., a corporation of Oregon Original application January 17, 1938, Serial No. 185,332. Divided and this application September 2, 1939, Serial No. 293,252

29 Claims. (Cl. 146—28)

The present invention contains divisional subject matter taken from the pending application of Raymond L. Ewald and Henry A. Skog, Serial No. 185,332, filed January 17, 1938, entitled Fruit treating apparatus.

The present invention relates to the method and apparatus for pitting peaches and preferably relates to that part of the construction of an organized automatic machine which effects the pitting of the half fruit and particularly clingstone peaches.

Among the objects of the present invention are to provide an improved machine for removing the half pits from half peaches in a manner accompanied by the removal of the minimum amount of the flesh of the peach during the pitting operation; to provide an organized automatic machine for removing the half pits or pits from half peaches irrespective of the size or location of the half pit in successive half peaches; to provide an automatic machine for splitting a succession of whole peaches into halves including the pits thereof and for automatically removing the pits from the successive half peaches irrespective of the location and size of the half pits; to provide an automatic machine for removing a succession of half pits from half peaches irrespective of the symmetry of the half peaches and the eccentricity of the half pits by the utilization of pitting means including mechanism for imparting a lateral pit finding or pit locating movement to the pitting means or to the plurality of pitting blades wherein the blades are caused to contact with the edges of the pits or opposite sides thereof followed by a simultaneous movement of the blades at equal speeds about the contour of the pit whereby to remove the pit; to provide an automatic organized machine adapted to receive a whole peach to sever the peach and the pit thereof through a plane lying parallel to the maximum diameter of the pit and automatically to transport the severed halves to a pair of fruit holding devices so that each half fruit is deposited in a cup in correct position to be operated upon by the power operated pitting means; to provide an improved type of pitting mechanism for halving peaches including a pair of pitting blades each adapted to move approximately a quarter of a circle to remove the half pit from a half fruit and wherein each pitting means is first given a locating movement across the cut face of the half fruit to locate the underside edge of the half pit and is thereafter given movement along a true arc of a circle for removing the half pit; to provide improved pitting blades adapted to pass in a substantially semicircular pathway under a half pit and in such a manner as to permit a part of the half pit to project through an opening in the blade during the pitting movement whereby to avoid tearing the pit from the flesh of the half fruit; to provide an improved pitting means for pitting half peaches each containing a pit section and wherein each half peach in its pit section may be of variant size and wherein each half pit or pit section may be located in a variant succession of eccentric positions with respect to its half peach including a mechanism for automatically locating each half pit on the cut side of the half fruit and for thereafter automatically removing each half pit together with the minimum amount of flesh from each half fruit; to provide an improved fruit treating apparatus including means for pitting a half peach while the half peach is held in a fruit receiving means and loosely upon its own severed peel; to provide means for adjustably positioning a plurality of pitting blades to accommodate various sizes and shapes of half pits; to provide these and other objects of invention as will be apparent from a perusal of the following specification when taken in connection with the accompanying drawings wherein:

Figure 1 shows a side elevation of one embodiment of an organized machine wherein the pitting mechanism herein claimed forms but one station thereof and which pitting mechanism is adapted to operate upon a half peach from which the peeling has already been removed, it being understood, however, that the present invention is not necessarily limited to an organized machine but may be utilized as a single operation for pitting peaches which have been processed on other machines irrespective of the construction of the other machines, and it is to be also understood that the invention is not necessarily utilized with half peaches which have been peeled since unpeeled half peaches may be likewise pitted by the present invention;

Figure 1:
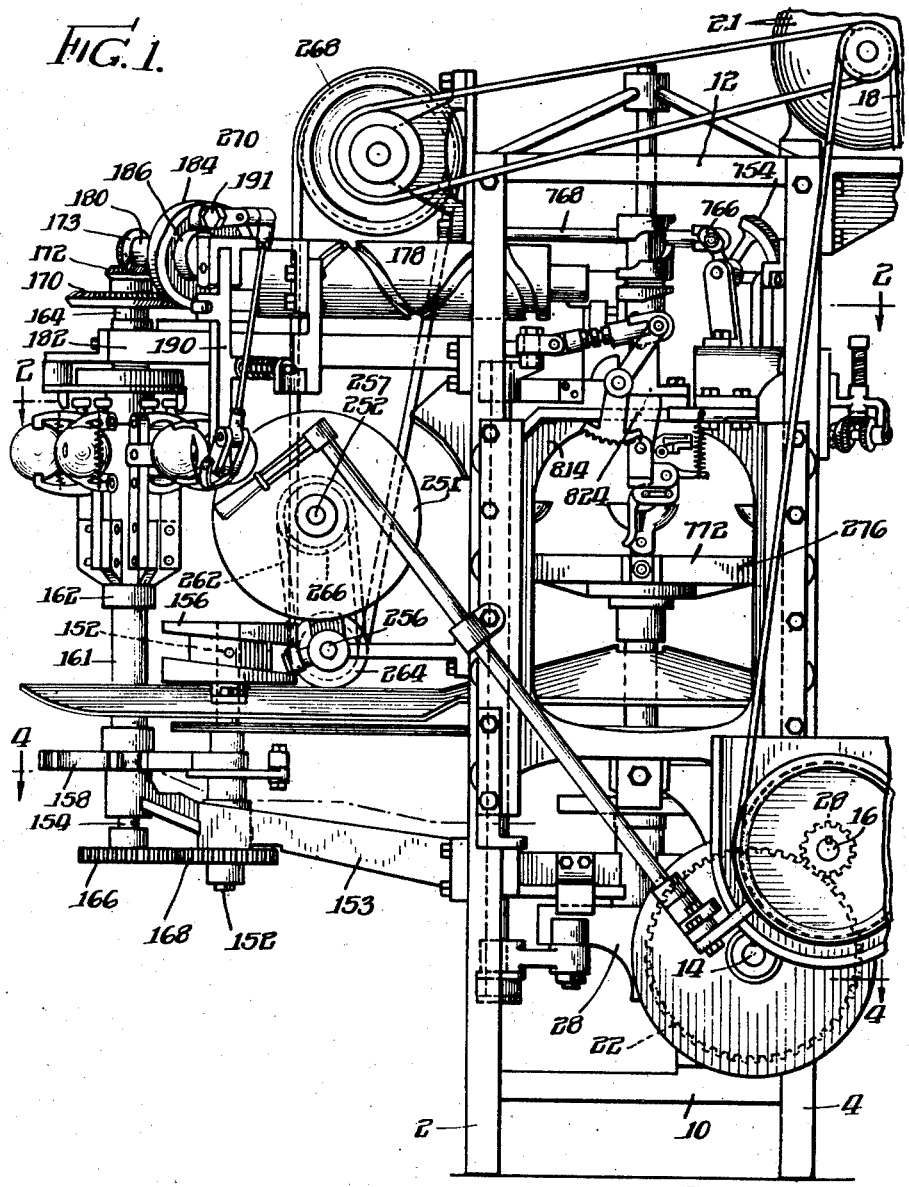
Figure 2:
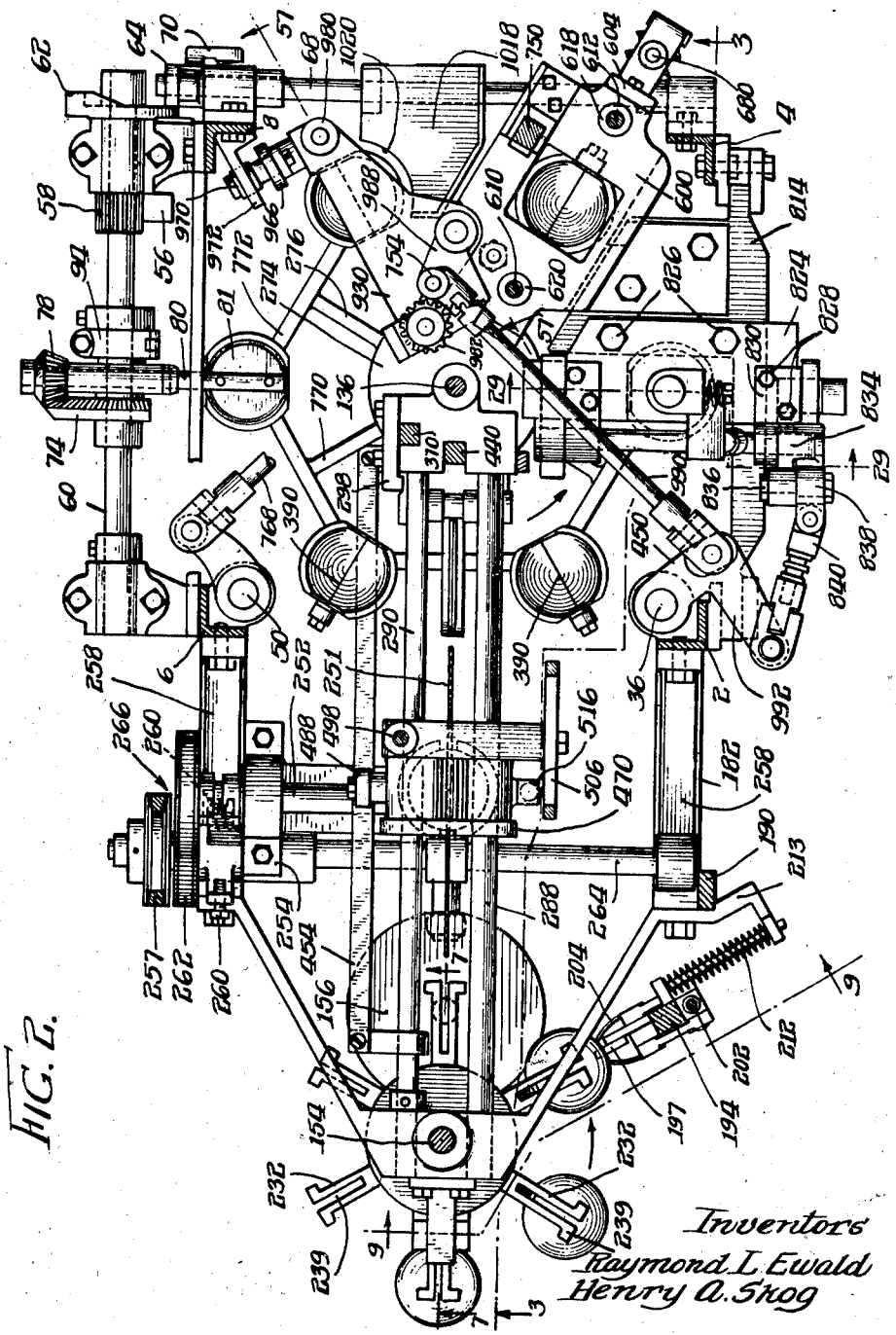
Figure 2 is a plan sectional view taken on line 2—2 of Figure 1.
Figure 3:
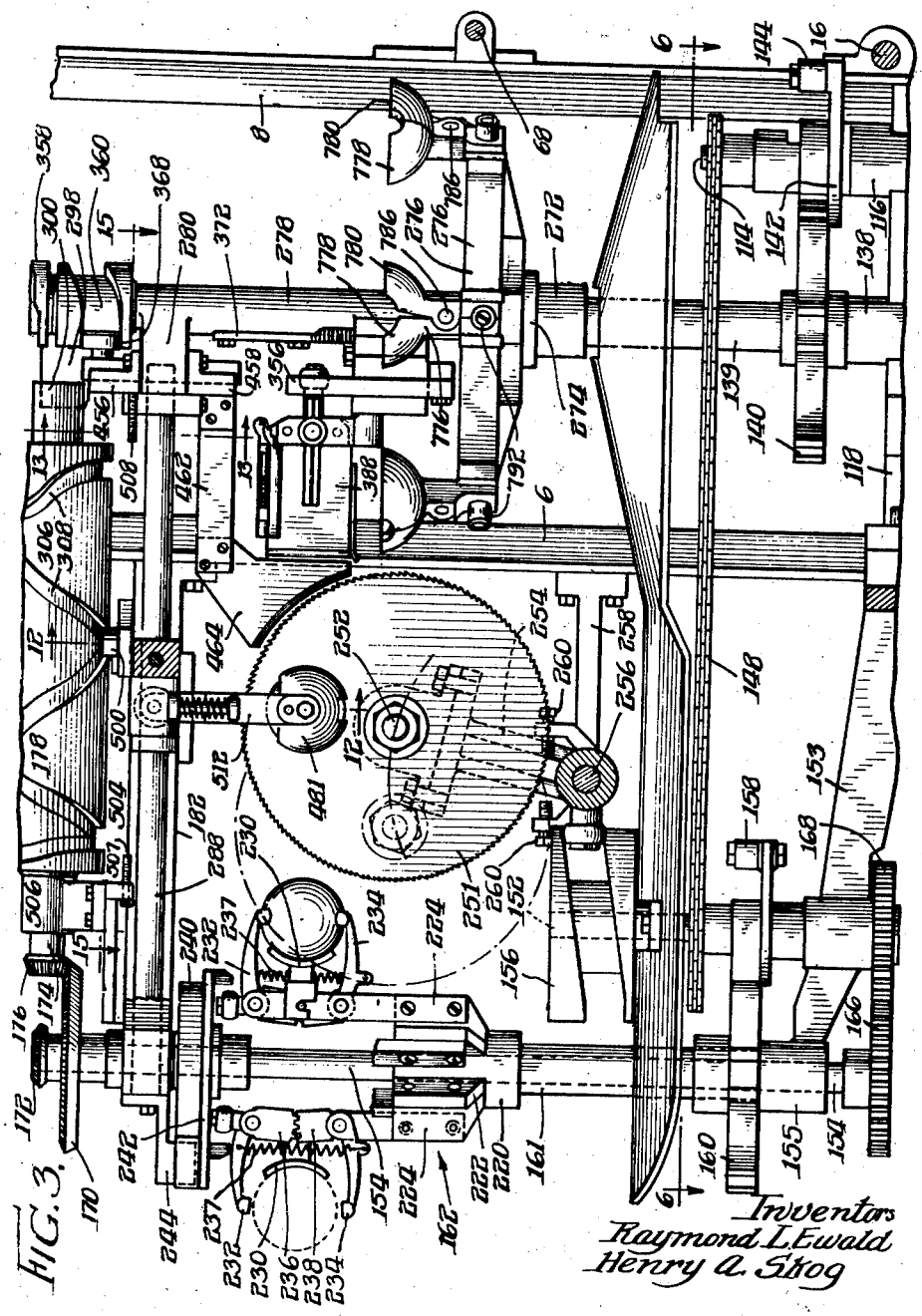
Figure 3 is a vertical section taken on line 3—3 of Figure 2.
Figure 7:
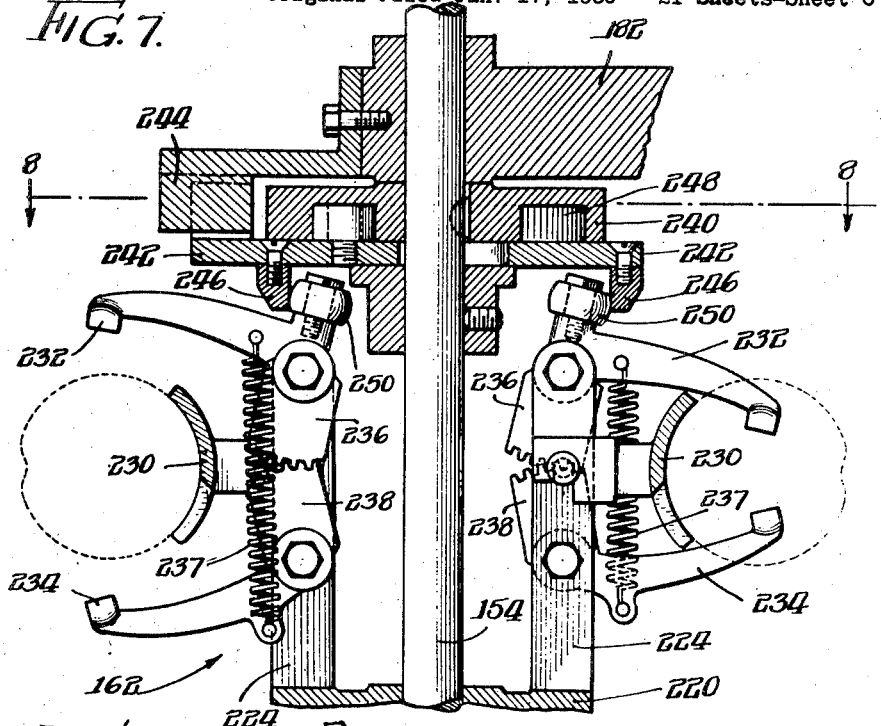
Figure 8:
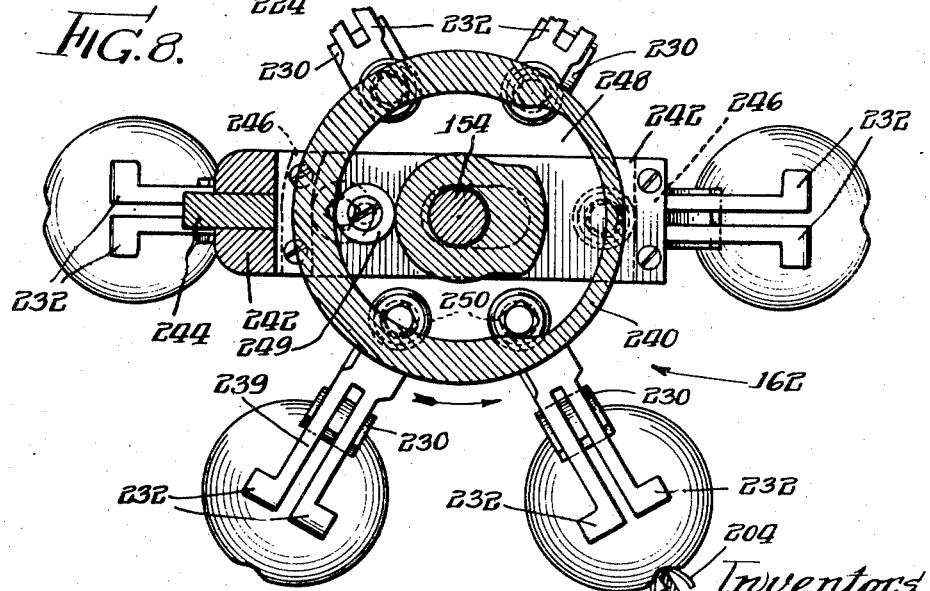
Figures 15, 16:
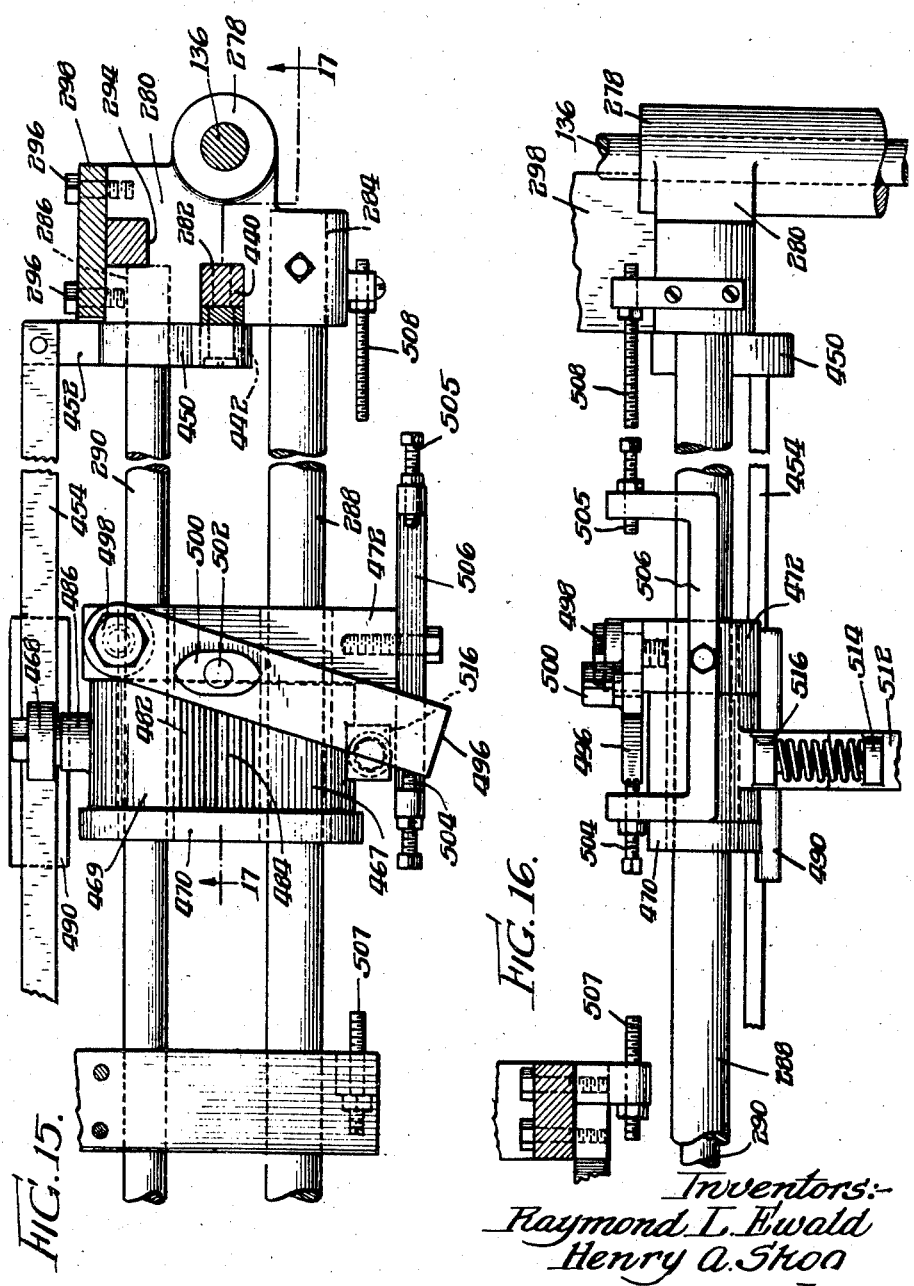

6—6 of Figure 3 showing part of the driving mechanism;

Figure 7 is a vertical sectional view taken on line 7—7 of Figure 2 showing the whole fruit feed turret;

Figure 8 is a plan sectional view of the feed turret taken on line 8—8 of Figure 7;

Figure 9 is a vertical sectional view of the means for cutting the peeling from the stem and of the fruit and taken on line 9—9 of Figure 2;

Figure 10 is a section taken on line 10—10 of Figure 9 with a view showing the cams that operate the cutter knives and the fruit holding knives;

Figure 11 is a detail sectional view of a knife carrier taken on line 11—11 of Figure 9;

Figure 12 is a detail sectional view of the fruit carrying arm, being taken on line 12—12 of Figure 3;

Figure 13 is a detail sectional view showing the means for operating the carrier jaws, the view being taken on line 13—13 of Figure 3;

Figure 14 is a view similar to Figure 13, but showing the mechanism in a different operating position;

Figure 15 is a plan sectional view taken on line 15—15 of Figure 3, and showing the means for imparting an additional movement to the transfer jaw carriage;

Figure 16 is a side view of the mechanism shown in Figure 15;

Figure 17 is a vertical sectional view taken on line 17—17 of Figure 15 and showing the carrier arms and separating blades;

Figure 18 is a detail plan sectional view showing the carrier arm approaching the separating blades, and also showing the fruit halves disposed upon the blades in dotted lines;

Figure 19 is a plan sectional view taken on line 19—19 of Figure 17, showing means for transferring fruit to the peeling cups, and also showing the separating blades in dotted lines indicating the positions they assume when depositing fruit into the fruit cups;

Figure 20 is a vertical section taken on line 20—20 of Figure 17;

Figure 21 is a sectional view taken on the line 21—21 of Figure 17, showing the fruit disposed upon the separating blades;

Figure 22 is a perspective view of one of the spreader means;

Figure 23 is a view showing one of the spreaders in a downward position;

Figure 24 is an exploded view of the parts of one of the spreaders and its operating means;

Figure 25 is an exploded view of the mechanism for operating the fruit spreaders;

Figure 26 is a fragmentary view of the lower portion of the right-hand end of the machine as viewed in Figure 1, showing part of the actuating mechanism;

Figure 27 is a fragmentary elevational view of the opposite side of the machine as that shown in Figure 1, with a portion of the frame broken away;

Figure 28 is a fragmentary view showing the mechanism for expelling the fruit from the machine;

Figure 29 is a vertical sectional view taken on line 29—29 of Figure 2, showing the peeling head;

Figure 30 is a front elevational view of the peeling head as it appears in Figure 29 when viewing it from the right;

Figure 31 is a sectional view taken through one of the peeling cups, showing the means for extending one of the inner walls of the cup sections;

Figure 32 is a side elevational view of the fruit pitting mechanism;

Figure 33 is a fragmentary sectional view of parts shown in the lower right-hand portion of Figure 32;

Figure 34 is a side elevational view of the pitter assembly, being viewed from the left as indicated by section lines 34—34, Figure 32;

Figure 35 is a vertical sectional view taken on line 25—25 of Figure 32;

Figures 36, 37 and 38 are front, rear and bottom plan views, respectively, of one of the pitter blades;

Figure 39 is a sectional plan view of a portion of the pitting mechanism, being taken on line 39—39 of Figure 32;

Figure 40 is a plan view of the presser plate;

Figure 41 is a sectional view through one end of the presser plate, being taken on line 41—41, Figure 40;

Figure 42 is a sectional view through the opposite end of the presser plate, being taken on line 42—42, Figure 40;

Figures 43–46, inclusive, are successive views of the pitting mechanism, showing the operation of the link connection of the pitter actuating connections to the carriage mechanism;

Figures 47–51, inclusive, are successive views of the pitting operation when the half pit is substantially centrally located with respect to the half peach;

Figures 52–56 are views corresponding to Figures 47–51, inclusive, but showing an instance wherein the half pit is eccentrically located with relation to the half peach.

The present invention is best exemplified by reference to an organized, automatic machine adapted to receive a succession of whole fruit, such, for instance, as whole peaches, and particularly peaches of the clingstone variety, for continuously passing each of the succession of whole fruits through the machine, and for discharging each whole fruit as two processed half peaches in a manner suitable for subsequent canning; specifically, each whole fruit first has the peeling at its stem end removed; the whole peach is then split or divided substantially in half, which includes a division of the pit itself; the two halves are then automatically transferred onto spreader mechanism which deposits each half fruit into a fruit receiving means, which succession of fruit receiving means move past a peeling station where the peeling of each half fruit is automatically removed, thence past a pitting station where the half pit of each half fruit is automatically removed.

It must be apparent that the present invention has a plurality of aspects. First, from the standpoint of the method and apparatus for pitting per se, irrespective of the type of machine in which the pitting operation is carried out; and, second, that aspect of the invention wherein other parts or operations performed by the organized machine peculiarly combined with the pitting mechanism or pitting operation so that a whole peach handled but once and fed into an automatic holding device of the automatic machine will thereafter cooperate with other functions of the machine whereby to hold the whole peach precisely so that the same may be automatically divided along a plane parallel and substantially adjacent to the plane of the maximum diameter of the whole peach and thereinafter each half peach will be automatically handled and delivered to a pitting station and/or will first be delivered to a pitting station, at which pitting station the automatic pitting thereof is carried out without the intervention of manual or human agency; and, therefore, the claims in the present application are limited either to the pitting function per se and/or to the combination of the pitting function with other operations peculiarly incident and cooperative with the pitting function.

It is to be understood that while the present invention is peculiarly adapted to the treatment of peaches and particularly clingstone peaches, certain aspects of the invention are not to be limited thereto but are to be broadly interpreted as adaptable to any type of similar fruit to which the operation is adaptable; and it is in view of this that the meaning of the word "peach" in any of the claims herein is to be construed broadly as covering any type of similar fruit; unless the characteristics of the claims are otherwise specifically limited, the method and apparatus claimed pertain to the peach only.

*The description of the machine*

In order more perfectly to identify the subject matter of this application with the parent application 185,332, from which the subject matter herein is taken, and in order specifically and clearly to set out those features of the organized machine with which the pitting per se claimed herein forms combinative subject matter to be claimed, it is deemed important particularly for the purposes of exemplifying the entire invention to describe those portions of the machine of the parent application leading up to at least and including the pitting station, it being remembered that the subject matter not herein specifically claimed is claimed in other pending divisional applications and also in the parent application.

Figures 4, 5:
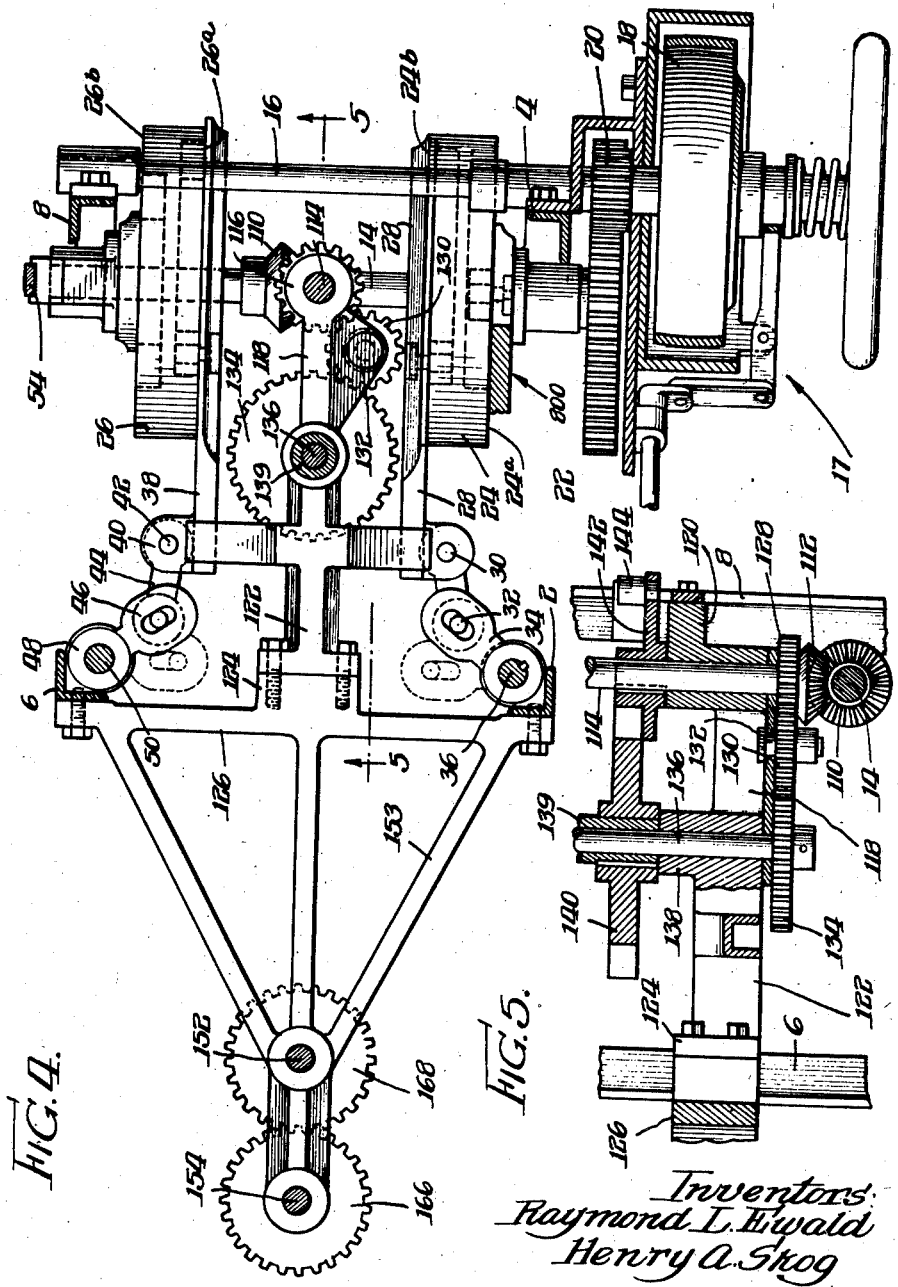
Figure 4 is a plan sectional view taken on line 4—4 of Figure 1 showing a part of the driving mechanism.
Figure 5 is a sectional view taken on line 5—5 of Figure 4 and likewise showing a part of the driving mechanism.

Referring now to the organized machine, it preferably takes the form of an upright, substantially square frame comprising four corner posts or angle irons 2, 4, 6 and 8, suitably braced at top and bottom by cross braces 10 and 12. In addition, other hereinafter described cross bars will serve as rigid bracing for these upright members. In a general way, extending laterally from this rectangular frame, projects a supplementary frame adapted to be bolted or otherwise attached thereto, as clearly shown in Figs. 1, 4 and 6. This supplementary frame is utilized to support the mechanism which initially receives the fruit, the mechanism which cuts the fruit in halves and transports it to the peeling, pitting, fruit discharging and peel and pit scavenging mechanism, the latter mechanism being supported on the rectangular frame. A fuller description of this arrangement will be given subsequently.

The upright frame hereinafter described is provided on a relatively low level thereof with horizontally disposed shafts 14 and 16. Shaft 16 is power driven through clutch mechanism 17, which includes a drive pulley 18 adapted to be driven from any suitable motor shaft having a motor 21 carried on a bracket mounted on the frame of the machine. The clutch mechanism 17 on the power drive is similar to that described in the pending applications of Mark Ewald and comprises purely a clutch for connecting and disconnecting the electric power source to the main operating shaft of the machine, and no portion of the present invention is concerned with the details of the clutch mechanism.

Shaft 16 carries a gear 20 driving another gear 22 on the horizontal shaft 14. This shaft 14 carries two main cams 24 and 26 fixed on opposite ends thereof. Each of these cams is double faced so as to provide cam operating means on the two opposed faces of each cam. Cam face 24a comprises a cam track in which operates a roller, hereinafter described, of a vertically reciprocable slide for raising and lowering the main tool carrying slide, hereinafter described. Cam face 24b forms a roller race in which a roller on a horizontally reciprocable slide 28 shifts in a horizontal motion transversely of shaft 14, and carries on its outer end a bearing pivot 30 linked to a bearing pivot 32 on an arm 34 fixed on a vertical shaft 36 having fixed bearings in the corner frame 2 of the main upright frame of the machine. This vertical shaft 36 is oscillated by the slide 28 for operating the peeling mechanism hereinafter described and also for operating the fruit discharging mechanism hereinafter described by means of cranks fixed to the upper end of this vertical oscillatable shaft 36.

The cam 26 on shaft 14 has a cam face 26a formed as a cam race in which operates a roller on a somewhat similar horizontal reciprocable slide 38 and corresponding to slide 28, which slide 38 is also provided on its outer end with a bearing 40 for a vertical pin 42, to the lower end of which is pivoted a link 44. This link 44 carries at its outer end a link 46, the outer bearing 48 of which is pinned to a vertically oscillatable shaft 50 which is mounted in the corner post 6 of the frame and in an opposite manner to the vertical shaft 36. This shaft 50 carries on its upper end a fixed arm hereinafter referred to, which in turn pivotally connects at its outer end to a relatively long rod running diagonally across to a universal connection in turn connected to mechanism which operates a gear sector reciprocable on a horizontal axis for operating the mechanism which actuates the pitting knives, all as will be hereinafter set forth.

Cam race 26b operates a vertically reciprocable slide 52, the upper end of which is provided with a rod 54 having a rack tooth portion 56 operating a pinion 58 on a horizontal shaft 60. This shaft 60 is oscillated by the rack and pinion to operate a cam 62 on the outer end of this shaft, which in turn is adapted through the instrumentality of a roller 64, mounted on a pivoted arm 66 for operating a horizontal shaft 68 having bearings on the outside of the vertical frame member and on a level of the main fruit cup turret, hereinafter described, and above the lower levels of the machine that carry the shafts 14 and 16.

The arm 66 which is carried by the shaft 68 has an extending portion 70 which engages a spring 72 mounted between it and the corner post of the main frame for normally pressing the roller 64 toward the cam 62.

The shaft 68 operates the mechanism for (a) positioning the rubber pad over the fruit cup for vertically holding the peel therein, and for (b) oscillating the fruit discharge trough, preferably carrying this rubber pad. These mechanisms (a) and (b) will hereinafter be more fully set forth.

As clearly shown in Figure 2, the present machine provides a greater number of stations and operations than prior types of machines disclosed in the patents and pending applications of Mark Ewald. While the present invention is not limited to a machine having the exact sequence of apparatus for performing the different operations upon the fruit passing through the machine, the present disclosed arrangement is particularly desirable for the automatic treatment and processing of peaches and in the disclosed sequence of operations. In the present instance these operations include:
1. A whole fruit feed station.
2. A peach stem cavity cutter and peeler.
3. A whole peach dividing and transfer station.
4. A spreader station where the cut halves are deposited in the half fruit receptacles on the main intermittently rotating turret mechanism.
5. A peeling station.
6. A pitting station.
7. A discharge station for the peeled and pitted half fruit.
8. A pit and peel scavenging station.

In the present invention the stations 7 and 8 are not described, although shown generally on some of the drawings, the subject matter being likewise reserved for other applications.

In the organized machine disclosed in the original application 185,332, a separate station was provided for effecting the discharge of the peeled and pitted half fruit. Since it was not practical in the processing of peaches to discharge the half fruit from the machine at the same station at which the pitting was carried out, the provision of a separate station in turn demanded a six half-fruit-holder turret instead of a four half-fruit-holder turret as was disclosed on prior Ewald types of machines. This six holder arrangement for the half fruit in turn makes desirable the disposition of single half fruit holders radially of the turret instead of in parallel pairs as heretofore; and this in turn, in conjunction with the six fruit holder feed-in turret for the whole fruit, has demanded a different motion of the half fruit spreaders as distinct from the single arcuate swing in the prior Ewald devices plus provision of means for driving the half fruit turret at twice the speed of the whole fruit turret whereby each half fruit holder of the latter turret is shifted say one hundred twenty degrees intermittently as the corresponding whole fruit holder is shifted sixty degrees to provide two spaced adjacent empty holders to receive the split halves of a whole fruit from each of the single holders of the whole fruit turret.

A second level of the main rectangular frame of the machine, bounded by the uprights 2, 4, 6, and 8, provides a location for the Geneva gears for driving the main half fruit holding turret and also the whole fruit feed turret, including the driving means therebetween, whereby the main half fruit holder turret is driven twice as fast as the whole fruit feed-in turret. For effecting this function, shaft 14 carries between its ends a bevel gear 110 meshing with a bevel gear 112 on a vertical shaft 114 mounted in a bearing 116 carried by a cross frame 118. This cross frame is supported by suitable vertical bracing connected to a cross bar 120 carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantially triangular-shaped supplemental frame carrying the whole fruit feed-in turret and the transfer mechanism.

Shaft 114 carries a bevel gear 112 and also carries above it a gear 128, which latter meshes with a second gear 130 on a bearing 132 on the cross frame 118. Gear 130 meshes with a larger gear 134 horizontally fixed on a vertical turret shaft 136 having a bearing in cross frame 118. Turret shaft 136 is surrounded by a bearing 138, above which is a long sleeve 139 upon which is fixed a Geneva gear 140 having six slots, cooperating with a Geneva member 142 on shaft 114. This latter Geneva 142 has the usual circular periphery provided with a roller 144 for cooperation with the six radial slots aforesaid, for rotating the Geneva wheel and sleeve 139 and for holding it stationary between partial turns. The upper end of shaft 114 above the Geneva member carries a sprocket gear 146 driving a chain 148 running horizontally across the frame of the machine to a larger sprocket 150 fixed to shaft 152. This shaft 152 is mounted on a substantially triangular frame 153 carried by and integral with the cross bar 126. The outer end of frame 153 carries a bearing for the shaft 152 and also has a heavy extension bearing for whole fruit turret shaft 154. Both of these shafts are vertical and parallel to each other. Shaft 152 extends upwardly a short distance and is provided on its upper end with a disc-like cam 156 of the double face type, for operating the saw shifting mechanism. Whole fruit turret shaft 154 extends vertically upwardly toward the top of the frame and carries the whole fruit feed turret sleeve 161 rotatably mounted thereon, Fig. 3.

Shaft 152 at its lower end has a roller element 158 of a Geneva fixed to it, and sleeve 161 has a slotted element 160 of the cooperating Geneva part fixed to it. This slotted Geneva has fixed to it the sleeve 161, see Fig. 3, which sleeve in turn carries the feed finger turret 162 provided with six whole fruit feed fingers.

The whole fruit feed-in station

Concentrically within sleeve 161 is the shaft 154, see Fig. 3, the lower end of which extends below the bearing 155, Fig. 3, and which has fixed thereto a gear 166 meshing with a gear 168 on the bottom end of shaft 152, whereby as the Geneva 158 intermittently rotates the sleeve 161, the gears 166 and 168 rotate the shaft 154. The upper end of shaft 154 is provided with a crown gear 170 having radially extending peripheral teeth, and shaft 154 is also provided with a bevel gear 172. Crown gear 170 drives a shaft 174 through bevel gear 176, which shaft rotates an endless screw 178 for operating the fruit transfer mechanism, hereinafter described, while bevel gear 172 through another bevel gear 173, drives a horizontal shaft 179, see Fig. 9, rotating in a bearing 180 mounted on upper frame 182, which latter is a horizontal frame extension corresponding in general to the lower frame extension 153, see Fig. 4, and in which upper extension 182 the shaft 154 has a bearing.

The stem cavity cutter or peeler

Means is provided for automatically peeling or cutting the peel of the whole peach within the cavity in which the stem is located. Referring to Figs. 9, 10 and 11, on the opposite end of shaft 179 is fixed a compound cam comprising a large cam disc 184 having a peripheral high and low edge and a concentrically-within cam 186. On a support 190 mounted on frame 182 is pivoted, as at 191, a lever 192 having a cam roll 193 rotatable thereon, and adapted to cooperate with the edge of cam 186 for pivotally shifting lever 192 in a vertical plane. Pivoted at 193 to mounting 190 is a long lever 194, the lower end of which carries a substantially L-shaped arm 196 having a nose or holder 197 adapted to enter the stem indentation or cavity of the whole peach as the latter is held by the whole fruit feed mechanism hereinafter described, and is thereby brought opposite to and held by the feed fingers of said feed mechanism. The upper end of arm 194 below its pivot 193 is provided with a roller 195 adapted to be contacted by a lateral edge of cam disc 184 for shifting this lever 194 toward and from the feed fingers of the whole fruit feed turret. The lower end of arm 194 is also provided with a pivot 199 on which swings another arm 200, the rear end of which has a pivotal connection 201 with a rod 202. This rod 202 pivots at 203 to the rear end of the lever 192. The front end of lever 200 is provided with any desired means for cutting the peel within the stem cavity. In the present form this means includes opposed blades 204 spaced apart about one-eighth inch to allow the points to pass either the holder 197 or the end of the pit, depending upon the depth of the cut. By the foregoing mechanism, when a peach or similar fruit is fed or positioned with its stem indentation opposite the nose 197, and when the latter is swung outwardly to enter the indentation, the lever 200 will be automatically swung upwardly, carrying the knives 204 through the cavity and form opposed, spaced cuts thereacross to cut the peel free from such indentation, and particularly when the subsequent peeling operation is carried out as hereinafter will be described.

The rear of lever 194 has a coiled spring 212 abutting thereagainst, which also acts against a fixed arm 213 on support 190 for returning the lever 194 resiliently to press the nose 197 into the stem cavity of the whole peach. In addition, a coiled spring 214 connected to the rear end of lever 200 serves to pull the knives 204 downwardly after the cutting operation.

*The whole fruit feed-in turret*

Means is provided whereby an operator may feed whole peaches one at a time to the feed-in turret, and this feed-in means preferably comprises a plurality of conveying means, specifically relatively movable fingers which are adapted to grasp the curved surface of each of the whole peaches and to convey them to the splitting or dividing station as hereinafter described. Whole peaches are of varying shapes. Some are lopsided with respect to the plane of the suture, others are symmetrical with respect to the plane of the suture. In the great majority of cases the maximum diameter of the pit of the peach is in the plane of the suture; in a smaller percentage of whole peaches, the maximum diameter of the pit may be positioned to one side of the plane of the suture. In any event, it is desirable to cleave or cut through the flesh of the fruit and also the pit in a plane parallel with the plane of the maximum diameter of the pit. The feed-in turret for the whole peaches, in the present invention, is constructed and arranged so that whole peaches are positioned in the holding mechanism of the feed-in turret in such a way that the plane of the maximum diameter of the peach, irrespective of the plane of the suture, is centrally located with respect to the grasping or holding means of the feed-in turret whereby when the feed-in turret is intermittently moved to the peach dividing position, the plane of operation of the dividing mechanism will be parallel with the plane of the maximum diameter of the pit. In the present instance, also, the feed-in turret and dividing station are constructed and arranged so that the peach, together with its whole pit, is divided while the whole peach is held within the grasping means of the turret and in such a manner that the contacting pressure of the grasping means is disposed on opposite sides of the peach dividing means and relatively close to the line of cleavage whereby any lateral pressure of the grasping means in holding the peach during the cleaving operation is avoided, and whereby a clean cut is effected. In addition, the peach is positioned and held in the holding means of the turret with preferably the longer axis of the pit disposed horizontally and also radially of the axis 154 of the turret.

Referring now to the specific mechanism for accomplishing the foregoing and other functions, fixed on the upper end of sleeve 161, see Fig. 3, is a feed head comprising a second sleeve 220 having in the present instance six radially disposed outstanding lugs 222, to each of which is fixed upstanding support bars 224 carrying the relatively shiftable feed fingers which comprise the whole peach holding means. Each feed finger device includes a relatively fixed replaceable holder or finger 230, which finger may be of varying sizes and suitable curved to receive and position the butt end or blossom end of the whole peach. Any suitable means may be provided for detachably holding the finger 230 in place. In addition there are upper and lower fingers 232 and 234, each having an integral toothed sector 236 and 238, respectively intermeshing to provide simultaneous opening and closing action. A spring 237 connecting the arms 232 and 234 normally tends to bring the fingers to relatively closed position whereby to hold the whole fruit therebetween. As shown more clearly in Fig. 2, each of these fingers is provided with radially extending slots 239 which extend back for substantially the entire length of the fingers whereby to permit the saw or cutting means, hereinafter referred to, to pass substantially through an entire whole fruit and completely to cut the pit of the whole fruit while the whole fruit is held stationarily between these fingers 232 and 234. It will be noted that these slots 239 substantially provide divided fingers which engage the whole fruit laterally and adjacent the line of cut so that the whole fruit is held substantially at the line of cut and not by any means that tends to press at an angle to and particularly at a right angle to the plane of action of the cutting means. It is important that the minimum lateral pressure be exerted on the whole fruit during the sawing action of the pit, since such lateral pressure tends to press together the flesh of the fruit during the cutting action, and what is more important, tends to make jagged cuts in the marginal edges of the peach during the severance of the pit, which tends seriously to impair the appearance of the half peach sections during subsequent pitting, and tends to embed the slivers of pit into the flesh of the fruit, thereby impairing its flavor, appearance and quality.

Means is provided for positively opening the fingers and for permitting the spring resiliently to close these fingers whereby to engage and releasably hold the whole fruit therebetween during the cutting or sawing operation of the peach and whereby also to hold the two severed halves and to permit them to be grasped and transferred to the mechanism for depositing each half into a holding means, herein specifically illustrated as a cup. Beneath the support extension frame 182 and keyed on the upper end of shaft 154 is a cam guide 240. Below the under surface of this cam is slidably disposed a cross slide 242 guided by a lug 244 on the under side of frame 182. This slide 242 has two depending lugs 246 forming integral extensions thereof and which lugs are 180 degrees apart. Cam 240 is provided with a cam face 248 which extends approximately 360 degrees of the total annular travel of the cam 240. Cam slide 242 has a roller 249 pivoted on its upper surface which runs in the cam race 248 on the under side of cam 240 to shift the slide 242 back and forth with a straight-line motion. When this slide 242 is moved toward the feed-in station of the machine, i. e., away from the pitting station, the depending lug 246 nearest the pitting station moves toward the feed-in station end, and thereby pushes the roll 250 on the top of the upper finger 232, see Fig. 7, inwardly toward the shaft 154 to open the fingers 232, 234. At the same time, the lug 246 which is spaced 180 degrees therefrom moves in the same direction to permit the spring 237 to close the oppositely located fingers and thereby to hold the whole fruit between the fingers. The whole fruit, which is herein illustrated as a whole peach, is thus held in step-by-step rotation of the feed turret, which carries the peach first to the stem cavity cutter for trimming the stem indentation and thence to the dividing or sawing station, at which station the feed fingers 232 and 234 are positively opened by the cross slide lugs 246 in properly timed relation to permit the transfer fingers, hereinafter mentioned, to grasp and carry the severed halves or substantially severed halves of the peach from the sawing or dividing station to the spreading mechanism hereinafter mentioned.

By means of the foregoing mechanism, once the whole peach is placed manually with its suture line in a plane parallel with the plane of action of the rotary saw and with the maximum diameter of the peach placed centrally of the fingers 232 and 234, the whole peach will be firmly held in such position by these fingers and with the longitudinal axis of the pit extending radially of the turret. Thus held it will be positioned first opposite the trimming mechanism and thereafter will be laterally shifted by the turret into the plane of action of the rotary saw, whereby the stem end of the peach is first trimmed and thereafter sawed into two sections and in a plane parallel with the plane of maximum diameter of the pit, the line of severance made by the saw taking place through the plane of maximum diameter of the peach, which may or may not be through the plane of suture of the peach, although it will be parallel with the plane of suture of the peach.

The flesh and pit dividing means

Means is provided for splitting, cutting or sawing the flesh of the fruit and also the pit, and this is accomplished in a plane parallel with the plane of maximum diameter of the pit and while the whole fruit is held stationarily in the feed-in turret fingers as hereinbefore described. The fruit and pit dividing means preferably comprises a rotating saw 251 which is mounted on a shaft 252 carried in a swinging arm 254 in turn mounted on a shaft 256. This latter shaft is carried in bearings on arms 258 rigidly mounted on the main upright frame of the machine.

Opposed stops, i. e., screws 260, adjustably limit the oscillatory movement of the saw. The saw shaft 252 is rotated by a belt 262 through the instrumentality of a double pulley 264 and 266. A second and larger belt 257 runs on the pulley 264 and thence to a larger pulley 268 which latter is driven by the motor 21 mounted on the top of the main upright frame. This same motor 21 is utilized for driving the main driving pulley and clutch mechanism of the entire machine.

The whole peaches are hand fed between the open fingers 232 and 234 on the feed-in turret. As so fed, each peach is positioned with its crease vertical and its stem end outwardly. The upper and lower fingers 232 and 234, due to their intermeshing connection and their springs, always come to the same closed position with respect to a center line horizontally disposed half-way between the pivotal axis of the fingers 232 and 234. Peaches not being all of the same shape, some being generally round and others being lopsided, it is necessary to position or feed the peaches between the fingers with the largest diameter of the peach centrally located with respect to the central plane of the fingers, and with the crease or suture line parallel to a vertical plane passing through the fingers. When the fingers are swung to position the whole peach opposite the saw, as shown in Fig. 3, the inner curved wall of the peach will be supported by the finger 230 and the upper and lower curved wall of the peach will be supported by the spaced apart fingers 232 and 234 and on opposite sides of the slots 239, the fingers being spaced apart by these long slots. In this position the rotary saw 251 will advance about its pivot 256 to saw through the flesh of the whole peach as well as through the pit. The line of severance will pass through the peach on a plane parallel with the greatest diameter of the pit and preferably through the greatest diameter of the pit, if such diameter of such particular peach happens to coincide with the fixed plane of oscillation of the rotating saw. In a large percentage of instances, the saw cut will occur to one side of the largest diameter of the pit. The oscillation of the saw is such that it passes into the slot in the upper and lower fingers 232 and 234 as well as through a vertical slot in the bottom of support 230. The saw in its upward movement is arranged to sever the peach into two parts. If desired, the swinging movement of the saw in its forward movement may be arranged to sever all but a relatively small cord of the whole peach. It will be noticed that during this sawing action the peach is supported on each side of the upper and lower peripheries, close to the line of severance, and not at points at right angles to the line of severance. This eliminates the tendency of the saw to bind as it goes through the hard pit.

The main fruit holding turret

Means is provided for holding the divided or half fruit sections in a manner so that such sections may be subjected to one or more treatments; specifically, so that the half peach sections carrying the half pits therein uppermost may be held preferably with the longer axes of the pits substantially coinciding with the radius line of the turret that passes through the fruit holder holding such half fruit, whereby the axis of movement of not only the pitting means but also the peeling means will lie approximately parallel to the longer axis of the pit, and whereby the peeling, pitting and discharging of the half fruit from the holding means is facilitated.

In the present instance there is provided a sleeve 139 which turns loosely on the main vertical shaft 136 and extends upwardly above the Geneva disc 140. This disc is fixed to the lower end of sleeve 139. The upper end of sleeve 139 carries a boss 272 having an upper disc 274 to which the bottom-most spider of the fruit holding turret 276 is adjustably bolted, the adjustment serving to provide annular adjustment of the fruit holding turret relative to its turning sleeve, whereby to provide an adjustment for insuring that the half fruit receiving and spreading transfer wings or members, hereinafter described, are at the proper closed together position at the time the fruit halves come onto them.

As clearly shown in Fig. 2, the turret disc is provided with a spider providing a mounting for the half fruit receiving means, herein specifically shown as cups. There are six of these cups, each disposed with its center located radially of the shaft 136.

Directly surrounding shaft 136 above turret 276, is located a long sleeve 278, see Figs. 17 and 25. This sleeve forms a mounting for a plurality of devices. It is formed at its upper portion with a preferably integral outstanding projection 280 which faces toward the transfer jaws. As clearly shown in these figures, this projection 280 is formed somewhat generally rectangular. In the side facing the feed-in station it is formed with a substantially central vertical guideway 282 of rectangular cross section. On either side there are provided horizontal bores 284 and 286. Bore 284 receives stationarily one of the rails 288 for the slidable carriage of the transfer jaws. The rail is held fixed therein by means of a set screw. The other bore, 286, receives a bushing 289 into which is turnably mounted the other round rail 290 forming the carriage slide. Lateral face 292 of the projection 280 is formed with a vertical guideway 294 of rectangular cross section. In addition, the walls of this lateral face 292 are provided with bolt holes to receive bolts 296 for attaching to this face and closing the face of the guideway 294 a vertically extending bracket 298, the top of which overhangs the projection 280 and is formed with a laterally extending arm terminating in a bearing sleeve 300 in which is loosely mounted shaft 174, see Fig. 3. Shaft 174 is driven by shaft 154 of the feed-in turret and has a circular collar 302 pinned thereto, as at 304, which circular collar supports fixedly thereto by means of the same pin 304 the cylinder 178, upon the outer wall of which an endless screw 308 is formed.

The lower portion of long, vertical sleeve 278 is formed with a preferably integral, substantially rectangular, flat portion 310 which extends laterally of the sleeve. This plate is likewise provided with a rectangular raised boss 312 which terminates on each side short of the vertical sides of the flat portion 310 to provide two spaced guides 314 and 316. The front face of the raised boss 312 is formed with a threaded bore 318 into which passes a bolt 320 for firmly fixing to the raised boss a bearing block 322, having on its top spaced half bearings 324 and 326 so that the upper inner faces of the half bearings 324 and 326 are spaced from the front face of the flat portion 310 to provide room for intermeshing sectors 328 and 330 fixed on the inner ends of short shafts 332 and 334. These shafts oscillate in the bearings 324 and 326, and their outer ends have fixed thereto short levers 336 and 338, which each have at their upper ends outwardly and oppositely facing bushing sleeves 340 and 342. Bearings 324 and 326 are closed by upper half bearings 344 and 346 formed in a cap 348 screwing fixedly into the block 322. This bearing block 322 is formed at its bottom with opposed extensions 350 and 352 having threaded bolt holes. To each extension is bolted a vertically extending silent cam 354 and 356.

Means is provided for operating the half fruit spreaders from the central rotatable vertical fruit turret shaft 136 and for likewise operating therefrom the fruit transfer jaw mechanism. Above the upper end of the long, vertical sleeve 278 and below the overhanging bracket 300 are positioned two cams 358 and 360. These cams directly surround shaft 136 and are pinned thereto for rotation with shaft 136. Each of these cams is formed with an endless cam race of desired shape, into each of which operates a roller 366 and 368. Roller 366 is mounted upon the upper end of a vertically reciprocable rack rod 370 which slides in guideway 294 of the upper bearing 280 on sleeve 278. This rack rod has fixed to its lower end a rack 372, the teeth of which, as shown in Figs. 17 and 25, mesh with the teeth of the sector 328.

The half fruit spreaders

This rack rod 372 slides against face 314 of the bushing 312. The bottom of this rack has bolted thereto a cross bar 374, to the other end of which is bolted a shorter, vertical rack 376 which slides against the face 316 of bearing 312. The teeth of this rack mesh with the teeth on the second sector 330, wherefore upon vertical reciprocation of the racks 372 and 376, the shafts 332 and 334 and their arms 336 and 338 will be oscillated.

Loosely turnable in each of the bearing sleeves 340 and 342 are short shafts 378 and 380. Each such shaft has integrally, as a part of one end, a small plate 382, 384, see Fig. 24, extending at right angles to the shaft. These plates carry the spreader arms or plates 386, 388, which are relatively thin, flat and preferably rectangular.

Means is provided for oscillating each spreader plate from the vertical position, in which position the plates abut one another, and in which position the fruit halves are received on either side thereof, as shown in Fig. 21, to a position in which the two plates are substantially horizontal and wherein each plate is immediately over a fruit holding cup and approximately three-quarters of an inch, more or less, thereabove. This is the half fruit depositing position, and is accomplished by the racks 372 and 376 and the toothed sectors 328 and 330 heretofore described.

Means is provided for throwing the center line of each spreader plate exactly 30 degrees from the parallel central axis of the two parallel shafts 332 and 334 which oscillate the blades to a position wherein the blades will lie, when horizontal, radially of the fruit turret 276 to correspond with the radial position of the center line 390 of the fruit cups, which line lies on the radius of the central axis of the vertical shaft 136 of the fruit turret, as shown in Fig. 2. This means includes the two spaced silent cams 354 and 356 cooperating with the rollers 392 and 394 mounted on the ends of short arms 396 and 398, each having a sleeve 400, 402 keyed as at 404, 406, on the two shafts 378 and 380, see Figs. 17 and 24.

This motion of the spreaders demands that the outer ends of the spreaders describe a much greater arc than the innermost ends, in order to overlie the radial cups. This in turn requires means cooperating with the spreaders, and preferably on the spreaders, for positively holding the severed peach halves on the spreaders during this arcuate movement. In the prior Ewald machines disclosed in pending applications, the spreaders are provided with substantially central sharp fins that cut into the central relatively soft core of the half pears or other half fruits and tend to hold the half pears on the spreader during the quick downward flip thereof. In addition, the transfer jaws were positioned relatively close to the half pear on the spreader and moved directly outwardly away from the spreader and half pear as the spreader moved downwardly to deposit the half pear in the cup, whereas in the present peach machine, due to the necessity of the additional arcuate movement imparted to the outer portion of the spreader, the transfer jaws cannot be positioned so close to the spreader to provide the additional support for the peach. Also, due to the presence of the hard pit, no cutting fin or blade can be placed on the spreader to hold the half peach from slipping down on the spreader. Therefore it is necessary to provide a bottom shelf or ledge on the bottom side of the spreader with outwardly flaring outer ends to guide and support the bottom peripheries of the half peaches, and likewise to provide a top holding means with outwardly flaring entry edges to guide and to overlie the upper peripheries of the half peaches as each half peach is transferred onto the spreader. This upper holding means is spring pressed normally to closed position and is moved outwardly by the entering half peach so as to close over the upper edge of the half peach and to hold it on the spreader.

Means is also provided for automatically shifting the holder outwardly in the down position of the spreader to release the half peach into the cup. To this end the bottom outer face of each spreader, see Figs. 21-24, is provided with a narrow ledge 410 having a downwardly flaring front lip 412. The upper outer face of each spreader is provided with a retaining clamp 414 formed by providing the upper outer face with two spaced outstanding lugs 416 and 417 bored to receive a pin 420 which also passes through two spaced lugs 418 on the outer face of the elongated clamp 414. A tensioned spring 422 is coiled about the pin and arranged normally to resiliently hold the clamp 414 snugly against the upper outer face of each spreader. The front wall of each elongated clamp flares outwardly as at 424 so as to direct the peripheral wall of the half peach beneath the clamp, thereby slightly to open the clamp and to hold the upper edge of the half peach against the spreader plates 386 and 388 while at the same time the ledges 410 will hold the lower edge of each half peach. The rearmost portion of each pivoted clamp is provided with an integral releasing arm 426 which, when the spreader plates reach horizontal discharging position, as shown in dotted lines in Fig. 19, contacts a fixed stop 428 on the stationary part of the frame, whereby to open the clamp against the spring tension. In addition, each spreader plate is provided with means for ejecting the half peach from its surface when the spreader reaches horizontal position. This comprises an arm 430 pivoted at 432 within a cut-out 434 in each spreader plate and normally lying within the outer face of the spreader plate. Each such arm is provided with an extension 436 adapted on horizontal positioning of the spreader plate to contact a fixed stop 438 and swing the longer arm 430 of the ejector outwardly forcibly to eject a half peach downwardly into its cup. This ejecting movement takes place substantially simultaneously or in adjustably timed relation with the action of the arm 426 against the stop 428 for releasing the peach from the swinging peach distributing or spreader plates 386, 388.

The fruit transfer mechanism

Means is provided in association with the feed-in turret fingers and saw and spreader plates for transferring the severed or partly severed whole fruit from the first feed-in turret, past the saw, and for delivering the divided sections or half peaches onto the spreader plates for subsequent delivery into the fruit cups. To this end two parallel rod rails 288 and 290 are supported at one end in the bores 284 and 286, respectively, of the enlargement 280 on the upper end of the vertical sleeve 278, see Figs. 12-14. The opposite ends of these rails are supported in bearings on a cross brace carried by the frame at the vertical shaft 154 which operates the feed-in turret. Rail 288 is fixed against turning, whereas rail 290 is mounted in its bearing 289 and its opposite bearing for oscillation. Cam 360 through its roller 368 vertically reciprocates a slide 440 carrying a pivotally mounted block 442, which block slides between furcations 446 and 448 on an arm 450 keyed on shaft 290. The opposite end of arm 450 carries an offset arm 452 on which is rigidly mounted an elongated rail 454 extending parallel to the rail rods 288 and 290. Bolted to the upper side and under side of the projection 280 are two guides 458 and 460 which form a vertical slideway for the vertical slide 440. In addition, the lower guide 458 has bolted to its front, as at 460, a bracket 462 for supporting a stationary spreader blade 464 interposed between the rear position of the saw 250 and the oscillatable spreader blades 386 and 388, see Fig. 3. This stationary blade shifts the peach halves laterally out of contact with the saw and onto the oscillatable spreaders.

A transfer jaw carriage is composed of two parallel sleeves 466 and 468 connected at each end by castings 470 and 472. Rotatably mounted on sleeves 466 and 468 by means of concentrically surrounding sleeves 467 and 469 are two depending arms 474 and 478 maintained always at the same distance mutually from the center line 480 by means of intermeshing gear sectors 482 and 484. Projecting from one side of sleeve 469 is a lateral lug 486 carrying a roller 488 which is adapted to lie on the rail 454. Slidable on the rail 454 is a shoe 490 having a pin threaded into its under side and depending therefrom. A coiled spring 492 surrounds this pin between the shoe and a lug 494 which is screwed into the lower part of arm 478, through which the pin moves freely. The function of this spring connection is to permit the cam mechanisms 368 and the arm 452 that oscillates the rail 454, to force the rail to its down position even if the arm 478 is pushed outwardly due to an oversized or larger half fruit engaged by the cup on the arm 478. This spring 492 also serves to maintain a proper tension upon the jaws on arms 474 and 478 to transfer the fruit.

The transfer jaw carriage is provided with an adjustable travel over and above the travel given to it by the screw 178. This is done by a lever 496, see Figs. 15 and 16, pivoted to casting 472 by a stud 498. This lever carries a dog 500 which is secured to the lever 496 by a stud 502 and which runs in the endless groove of the screw 178. As the carriage moves to the left through the endless groove and its dog 500, it reaches a point where the lever 496 contacts an adjustable pin 507 dependent from a bearing support casting 506, see Fig. 3. Since this contact stops further movement of the outer end of the lever 496, and since at this point the dog 500 on the lever is still continuing to travel to the left, the outer end of lever 496 will be swung to the left about stop 507 as a fulcrum, and since the transfer jaw carriage is rigid with the pivot 498, the carriage itself moves to the left an additional distance beyond the distance it is caused to travel by its endless screw. In addition, this mechanism provides a longer rest period at the points or times when the jaws are transferring fruit from the feed-in jaws to the transfer jaws and from the latter to the spreaders.

On the return movement of the carriage, the first action is that of dog 500 in shifting the lever 496 about its pivot 498 in a direction to the right until the free end of this lever strikes an oppositely adjustable stop 505, whereupon the continuing movement of the dog to the right compels movement of the carriage to the right through the pivotal connection 498. At both ends this additional travel of the carriage on the rails is provided with adjustable stop means 507 and 508 for adjustably determining the extent of total movement of the carriage.

To accommodate differences in thickness of relatively thicker or thinner halves of fruit on the same peach when grasped by the transfer jaws 474 and 478, one of these jaws is broken and hinged and provided with supplemental springs to make up this difference in thickness. For instance, arms 474 and 478 come together in unison to a common distance from the central plane 480, Fig. 12. Arm 474 is provided intermediate its height, as at 510, with a pivotal connection to a lower portion 512. Arm 512 below pivot 510 has an outstanding lug 514 between which and another lug 516 on the upper part of arm 474 a coiled spring is confined at each end. In operation this provides the necessary resilience to take up the variation in thicknesses. If desired, both arms may be provided with this type of resilient adjustment.

To provide against turning the peach as it is dragged over the surfaces of the saw, after splitting, there is provided on the inner surface of the transfer cups 481 sharp, knife-like fins 518, 520, which lie in a vertical plane to prevent the peach halves turning in the transfer cups about horizontal axes. This means preserves the positions of the halves of the peaches during the transfer from the sawing station to the pitting station.

Claims drawn to the combination of a plurality of operations carried out by the organized machine, as well as claims drawn specifically to the whole fruit feeding station, the peach stem cavity cutter and peeler, the whole peach dividing and transfer station, and the spreader station, are retained in the parent Ewald application, Serial No. 185,332, aforesaid.

*The pitting mechanism*

The pitting mechanism includes a preferably vertically reciprocating carriage 600 which is preferably horizontally disposed. This plate 600 has its opposite ends provided with depending furcations 602 and 604 suitably bolted thereto, as shown in Figs. 32 and 34. These furcations provide vertical guideways 606 for slidably receiving a vertically, resiliently adjustable pitting frame 608. This frame 608 has spaced portions receiving pins 610, 612, which pins have heads 614, 616 on their bottoms below the frame. The upper portions of these pins pass through the bores of the carriage 600 and are provided thereabove with adjustable stop collars 618 and 620 which determine the lowermost positions of this pitter frame 608 with respect to the carriage 600. The upper ends of these pins 610 and 612 are provided with coiled springs 622 and 624 spaced between the collars 617, 621 and the top of carriage 600. These springs resiliently support and balance the main frame 608 on the carriage. One end of the main frame 608 is heavier than the other because of the bevel gearing thereat. These two adjustable springs 622 and 624, when adjusted, serve to balance the weight of the main pitter frame 608 with respect to the carriage 600, and also reduce to a minimum the pressure exerted on the tender face of the peach. This pitter frame 608 is preferably formed like an inverted yoke and comprises a horizontal cross portion and two legs 626, 628. Each of these legs is a straight, vertical leg and is provided with a bearing. Leg 626 is provided with a bearing 630 and opposite leg 628 is provided with a bearing 632. The bottoms of the vertical guideways 602 and 604 of the main carriage 600 terminate at 634 and 636 respectively. Vertical leg 628 has bolted to it an extension leg 637 formed with a lateral horizontal extension 638, provided in turn with an upstanding boss 640. The boss and the lateral extension are bored to receive a vertical shaft, later to be described. Extension 638 is formed with a vertical leg 642 having a bearing 644 which is bored and is in registration with the bore in the bearing 632 of the adjacent leg 628. Thus the vertical legs 626, 628 and 642 slide vertically in the vertical guideways of the carriage 600. The two bearings 630, 632 each have bolted to the under side thereof, as at 645 and 646, a short bar-like support 648, 650, which supports extend inwardly and each has a roller 652, 654 rotatably supported thereon. These rollers form supports for mechanism hereinafter described.

Bearing 630 clampingly supports a fixed shaft 656 by means of a nut 658, which shaft has on its opposite innermost end a boss 660 which is flattened on its opposite vertical sides to form a guide for slidingly supporting and guiding the apertured presser plate 662. A second short shaft 664 is loosely disposed on bearings 644 and 632. This shaft 664 has pinned thereto, as at 666, a bevel gear 668, and also has pinned thereto, at 670, in spaced relation therefrom, a collar 672 carrying a lever 674 which at its upper end is formed as a bored collar 676, to which is pinned a cross shaft 678. Bevel gear 668 meshes with a bevel pinion 679 fixed to shaft 680 which passes through the boss 640 on the extension arm 638. The upper end of this shaft is formed with an adjusting collar 682 and a coiled spring 684 is fixed to the collar and to the extension. A second bevel gear 686 meshes with pinion 679. This bevel gear 686 is pinned at 688 to a sleeve 690, through which the shaft 664 passes. This sleeve 690 oscillates in bearing 632 and extends inwardly to a collar 692 which is integral therewith. This collar 692 has an integral lever 694 which has on its upper end another collar 696 pinned to a second cross shaft 698 running parallel to the first shaft 678. Each of these shafts 678 and 698 has a long sleeve 728 and 730 loosely surrounding it. Each of these sleeves has intermediate its length a lug or arm 710, 712, to which are detachably fastened the pitter blades 714 and 716, illustrated in Figs. 30 to 32 and hereinafter described. Sleeve 728 has in addition an integral arm 700 having on its bottom an enlargement 702 formed with an elongated slot 704 through which passes the fixed extension shaft 656 carried by the bearing 630. This slotted enlargement cooperates with roller 652 so that such roller in certain positions of the enlargement will limit its downward movement.

The other elongated sleeve 730 likewise has integrally depending therefrom an arm 706, the bottom part of which forms an enlargement 708, likewise provided with an elongated slot 709. This enlargement 708 in turn cooperates with roller 654 so that the latter in certain positions of the enlargement will limit the downward movement of the enlargement 708.

The extreme inner end of shaft 664 is of reduced diameter, as shown at 718, and is provided with a bushing 720 which is flattened on its two opposite vertical sides 722, 724 slidingly to support and guide the opposite upstanding block 782 on the apertured presser plate 662.

The slots 704 and 709 in the enlargements of arms 700 and 706 are on an arc that corresponds to the distance between the center of rotation of the sleeves and the center of rotation of the arms on which they are pivotally supported for oscillation.

The rollers 652 and 654 comprise means for preventing these slotted enlargements from dropping down when the arms 700 and 706 are swung to substantially a horizontal or diagonal position with respect to the presser plate 662, as shown in Fig. 49. If these arms 700 and 706 were to drop downwardly at this time, it would permit the pitter blades carried by the sleeves 728 and 730 to open and to swing downwardly and into the body of the peach during the pitting operation, whereas it is necessary to cause the pitter blades to move in a truly circular arc and to keep them together to complete the severance of the under side of the half fruit. To this end the bottoms of the main pitter frame 608 are provided with these rollers 652 and 654 which are thus positioned immediately under the path of oscillation of each of these slotted arms 700 and 706 to permit free, unsupported swinging movement of each of said slotted arms 700 and 706 for about a distance equivalent to less than one-third of the way around the under side of the pit, at which time the under surfaces of these slotted enlargements come in contact with the rollers 652 and 654, whereby preventing each arm from dropping down and compelling each arm and hence each pitting blade to swing in a truly circular path and hence follow closely the contour of the under side of the pit. The ends of the slots 704 and 709 cooperating with the pins 656 give control of the cutting edges so that they will meet properly at the finish of the cutting.

The function of the bevel gearing 668, 679 and 686 and the spring 684 is to provide tension between the pitter sleeve arms 700 and 706 through the bevel gears whereby to keep these arms together in their uppermost positions, see Fig. 33, and to provide sufficient spring resistance to be greater than the resistance offered by the drag of the pitter blades across the face of the flesh of the half fruit into contact with the marginal walls of the pit. At this time the pit offering greater resistance to the further dragging movement of these pitter blades, the spring resistance of the spring 684 is now overcome and the pit forming the stopping point of this dragging movement of the blades in their inward pit-locating movement, the blades then start to swing down through the flesh under the pit, around a common fulcrum or pivot point. The central axis about which these arms 700 and 706 now swing is the axis of the stationary shaft 656 and the axis of the coaxial oppositely disposed movable shaft 664. During the locating movement of the pitter blades, the axis about which each of the pitter blades swings is the axis of the elongated sleeve that carries such particular pitter blade. For instance, referring to Figs. 47-51, inclusive, during the pit finding or locating movement of the pitter blades, blade 714 will first swing about the axis of the shaft 678 carrying the sleeve 728, and blade 716 will first swing about the axis of the shaft 698 carrying sleeve 730. However, as soon as the pitter blade contacts the side walls of the pit, the pit will then form a fulcrum preventing further independent swinging of the arms 700 and 706 about their respective axes 678 and 698 and thereafter the said arms will swing about the common axis 656, which is the central axis of the coaxial shafts 656 and 664. By this means the pitter blades which swing with these arms will then follow closely, in a truly circular pathway, the marginal outlines of the pit, thus reducing to a minimum the amount of flesh cut from the fruit during the pitting operation. In short, the pitter blades will shift across the cut face of the half fruit, swinging on their respective axes 678 and 698, until each blade locates its respective edge of the pit, and thereafter each blade will then swing about the common axis 656 which is located very close to the cut face of the half fruit. The location of this shaft 656 is adjustably predetermined such that the arcuate swing of the pitter blades will be of just sufficient depth to cut cleanly around the under side of the pit without digging any extra amount of flesh of the peach.

The bevel gears of the gearing 668, 679 and 686 equalize and cause the pitter blades to move uniformly through their cutting strokes, i. e., they tend to prevent one blade running ahead of the other.

Each sleeve 728 and 730 is provided intermediate its length with an outstanding short furcation 732 and 734, to which is pivoted the bottom of an arm 736 and 738 curved outwardly at its bottom and extending upwardly. Means is provided to compensate for varying thicknesses of the half fruit to be pitted or cored. To this end the top of each arm 736 and 738 is slotted as at 740, 742, to slidingly engage a pin 744, 746 adjustably carried by a block 748 fastened to a vertical rack 750 supported by a guide 752 on the carriage 600. This rack 750 is reciprocated by a sector 754 pivoted at 756 on a mounting 758 on the carriage 600. This sector in turn is oscillated by an arm 760 having a slotted hole 762 engaging a pin 764 on a universal 766 on the end of an adjustable rod 768 operated by the vertically disposed oscillatable shaft 50 hereinbefore described.

Figure 43 shows the drive studs 744, 746 in the upper end of the slot, thereby holding the pitting blades in an open position as the assembly lowers down onto a half peach. Figure 44 shows the gauge plates 662 in contact with the fruit, and an example is depicted wherein the fruit is thick enough to raise the assembly to a point where the drive studs 744, 746 are in the center of the slot. If this slot were not provided, a thin piece of fruit would not get proper contact and a thick piece would be smashed, due to the fact that studs 744, 746 are rigidly placed at this time.

At the initiation of the pitting operation, in view of the fact that the successive half pits may be located either centrally of or to either side of the center of the half peach to be pitted, we have provided means for causing the pitting mechanism to travel laterally across the cut face of the half fruit and to contact the peripheral edge of the severed half pit before digging into the flesh of the fruit at the cut face thereof. In order to accomplish this action, the pitting means, which is shown particularly in Figs. 36, 37 and 38, is provided with one or more, preferably one, relatively sharp points centrally located, which is the only part of the pitting means which actually penetrates the flesh of the fruit at the cut face thereof prior to the actual pitting operation itself, at which time the cutting edges of the pitting means actually cut into the body or flesh of the half fruit, starting at the cut face of the half fruit at the peripheral or marginal edges of the severed half pit and following along the under surface in a true circular path and substantially exactly cutting the flesh of the peach cleanly at the juncture of the pit curved surface and the flesh.

To carry this out, at the initiation of the pitting operation it is desirable to project the point or points of the cutting edge of each pitting blade a predetermined short distance slightly into the flesh of the fruit at the cut face of the half fruit and on each side of the severed half pit. This projection of each point on the pitter blade is relatively slight but is sufficient so that during the lateral shift of each blade across the cut face of the half fruit these relatively small points on each pitter blade cut through a slight superficial layer of the cut face of the half fruit, the extent of cut being practically of a line width and being imperceptible due to the stickiness and moist nature of the cut face of the half fruit after it has been pitted and processed. This projection of each point on the pitter blade is sufficient, however, so that during the lateral shift these relatively small points on each pitter blade cut through the superficial layer of the cut face of the half fruit until they come into contact with the outer opposed edges of the half pit at the margins of the cut face, and since these points are projecting slightly into the cut face this insures that the points of the pitter blades will contact the pit half slightly beneath the cut surface of the pit at its margin, whereby to insure that the pitter blades will thereafter be directed downwardly around the under surface of the half pit in their cutting movement, so that they will swing around under or beneath the pit.

Thus means is provided for adjustably insuring and also determining this initial projection of the points of the pitter blades a desired relatively small depth into the cut face of the half fruit on opposite sides of the half pit. In the present embodiment of the invention there is provided means for contacting the cut face of the half fruit on opposite sides of the central seed containing section, to wit, in the case of a peach or apricot the half pit, and thereafter utilizing this contacting means adjustably to determine the depth of projection of the pitter blades into the cut face of the half fruit as before described. In the specific construction utilized, the presser plate 662 is preferably formed of two flat, shallow plates 770 and 772. The central edges of these plates are cut out, as at 774 and 776 and these cut-outs are in registration to provide an opening or aperture considerably larger than the greatest diameter of the half pit in order to accommodate variations in eccentric location of the various pits in successive half fruits. By spacing the plates apart as at 778, a sufficient aperture is provided. At opposite ends of these plates, blocks 780 and 782 are provided, which in general shape are similar except for a vertical guideway. Each block is formed with a pair of oppositely projecting arms 784 and 786 to which an end of the presser plate is secured, at at 787.

In addition, each block is formed centrally with an upstanding portion generally rectangular and provided with a vertically extending rectangular cut-out 790, 792, forming guideways to receive a bushing 720 at one end and the flattened portion 660 of shaft 656 at the other. This is for the reason that shaft 656 does not rotate and therefore the flattened portion 660 holds the presser plate in horizontal alignment and still permits vertical movement. Since shaft 664 rotates, a bushing is provided principally to take up undue wear in operation, otherwise the reduced shaft 718 could slide and rotate in a groove 792 made to fit its own diameter.

The top of each cut-out 790, 792 is closed by a plate 793 secured by a screw 796. The cut-out guideway 790 of block 780 is narrower than the cut-out guideway 792 of block 784. Cut-out 792 receives the bushing 720, Figs. 40 and 42, on the inner end of oscillating shaft 664. The vertical sides of this bushing and of the cut-out are parallel and vertical, whereby to permit the presser plate and bushing to have relative vertical movement to accommodate the action when pitting while prevented from rotating. Similarly, the somewhat smaller cut-out 790 of block 780 has parallel vertical walls slidingly to receive the flat, parallel, vertical walls 660 of an otherwise round sleeve 656 held securely against rotation in the bearing 630 by the nut 658, Fig. 42. It will be remembered that shaft 656 is stationary, while coaxial shaft 664 oscillates, being oscillated by arm 674 integral with sleeve 728, in turn oscillated by lever 736 from the sector and rack mechanism shown in Fig. 26. In addition, each block is provided with a centrally depending portion 802, 803, each bored vertically and threaded to receive an adjusting screw 806, 808, the upper end of which is adapted adjustable to contact, and in one position support, the bottom portion of the bushing 720 in the case of the block 784, and the circular sleeve 660 in the case of block 780. The height of each vertical guideway 790, 792 is sufficient to provide a space between the bushing 720 and the sleeve 660 when supported on their respective screws and the top plate 794 of each block. The adjustment of the screws through the blocks in a clockwise direction will raise the pitting blades relative to the presser plate so that they will not project downwardly through the apertures in the presser plate as far as they would project prior to turning the screws. Adjustment of the screws in the opposite direction will serve to lower the pitter blades relative to the presser plate, whereby when the presser plate contacts the cut face of the half peach the bottom edges of the pitting blades will adjustably project more or less into the cut face of the half fruit, which is to say that the pointed central tips 786 will so project.

On lowering movement of the pitter carriage 600, the presser plate is in its lowermost position. If no half fruit is in the cup the presser plate 662 will either be resting upon the top of the cup, or if no cup were there, the top plate 794 closing the tops of the cut-out guideways 790, 792 will be contacting the tops of the bushings 660 and 801, respectively. These bushings in turn rest upon the tops of the screws 806 and 808, respectively, when the presser plates rest on the fruit. These screws provide means for regulating the depth of projection of the cutting edges below the under surface of the presser pads or plates 770 and 772. These cutting edges must extend below far enough to assure closing in under the pit. Now, if upon lowering the pitter head with a cup in position and contacting a half fruit to be pitted, such as a half peach with its half pit unsevered from the half peach, the presser plate 662 will first contact the upper cut face of the half fruit and there will be relative vertical movement between the blocks 780 and 784 fixed to the now stationary presser plate and the still lowering bushings 660 and 720 until said bushings contact the tops of the adjusting screws 806 and 808 carried by the now stationary blocks on the now stationary presser plate. Thus when the presser plate contacts the cut face of the fruit and can move no lower, and when the presser plate screws 806, 808 have been adjusted to the correct setting, the points of the pitter blades will project through the opening in the presser plate the desired amount and the points 786 on the pitting blades will be projected the desired distance into the cut face of the half fruit on opposite sides and spaced from the half pit.

If too much of the half fruit should project above the upper rim of the fruit cup—that is, if the half sections of the fruit should be of extraordinary size, then the entire main frame 608 will rise vertically from the plate guideways, the springs 622 and 624 in this action taking the weight of the frame off the fruit face, the slots 740 and 742 between the actuating arms 736 and 738 and the rack 750 permitting this rise of the main frame. At this time the pitters are in an outwardly swung position, as shown in Fig. 47, and the sleeves 728 and 730 are pressed together by the spring 684. On preliminary downward movement of the rack 750, the arms 736 and 738 first swing the blades inwardly across the surface of the fruit, the points 786, Fig. 36, cutting slightly thereinto until these points strike the periphery of the pit. During this movement the pitter blades have swung about the individual axes 678 and 698. When the blades strike the periphery of the pit at the cut face of the fruit, the blades then swing or pivot about the common axis 656 of the coaxial shafts 656 and 664. If, during the swinging of the pitter blades about the separate axes 678 and 698 which are relatively remote from the cut face of the half fruit, the pit should be off center of the fruit, as in Figs. 52–56, inclusive, and one blade only contacts the pit, the other blade still approaching the pit, the approaching blade will continue its inward pit-locating motion until it also contacts the marginal edge of the pit. Thereafter, the blades striking the pit, the blades will then swing simultaneously about the common axis 656, thereby swinging the blades downwardly arcuately under the pit, cutting the flesh closely adjacent the pit, the blades tending to follow a true arc of a circle, the center of which is the axis 656 and the radius of which is the distance from the axis 656 and the underside of the pit wall.

As shown in Figs. 47–51, during the movement of the pitter blades from afar up to and around the pit for approximately the first one-third of the distance under the pit or somewhat less than the first one-third, the slotted arms 700 and 706 are out of contact with the rollers 652 and 654; but from the one-third distance on, these arms 700 and 706, due to their eccentric shape, will contact the upper surface of these rollers and will therefore be prevented from dropping and will compel the pitting blades to swing in an arc of a true circle, which will keep the pitting blades up against the under surface of the pit instead of digging down deeply into the flesh of the fruit beneath the pit. In short, these supporting rollers compel the pitting blades to make a shallow cut, thus following the natural contour of the pit. In addition, due to the construction wherein the pivoted actuating arms 736 and 738 moving downwardly are pivoted to arms 732 and 734 disposed substantially at 90 degrees to the face of the pitter blades, these actuating arms 736 and 738 tend to cause the blades to swing in a true circular arc closely following the curvature of the under side of the pit.

Just after the pitting blades 714 and 716 have started under the pit, the whole assembly rises so that the fruit is held clear from the cup, thereby causing the weight of the pitter pad assembly 772 to exert a force or pressure on the flesh only of the half fruit at its cut face in a direction away from the pitter blades, thus effecting a cut close to the under surface or peripheral curved wall of the pit. This action insures the cutting of a minimum of flesh of the pit, whether the pit is large or small.

The pitting blades

The preferred construction of the pitting blades 714 and 716 is shown clearly in Figs. 36, 37 and 38. These blades are drop forged from sheet metal. They include a straight, substantially rectangular portion 751 attached to the arms 710 and 712 of the pitter carrying sleeves 728 and 730 and are adapted to oscillate or swing in an arc toward and from the cut face of the half fruit. The main body 751 of each blade has integrally formed therewith a curved, relatively narrow blade member 753 curved laterally out of the plane of the body 751 and provided with an opening 755. The central portion of the curved cutting edge 757 is provided with a point located in the same plane of the curved portion 753 of the blade. The arcuate cutting edge 757 conforms somewhat to the elongated curvature of the peach pit when constructed for pitting peaches. The point 787 on the edge of the blade is desirable as it allows some portion of the blade to get down to the cut face of the fruit whereby to contact the edge of the pit without causing the main portion of the blade to mar the surface of the flesh during the pit locating operation. The opening 755 in the blade is provided to permit the maximum curvature of pit wall to pass or project therethrough during the pitting action, which eliminates tearing action which would otherwise occur if the blade were not apertured. A pit is wider than it is deep, and with a solid blade cutting would occur only part way and then the pit would be torn out, leaving a rough, jagged, unsightly cavity. This relief is due to the inner arcuate wall 759 forcing the pit upwardly away from the flesh of the fruit. It will be noted that each pitting blade during the actual pitting operation swings only approximately through one-fourth of an arc of a complete circle, the two blades finally meeting at the bottom of the pit to complete the severance of the half pit.

The function of the rollers 652 and 654 acting in conjunction with the slotted enlargement 704 and 709 on the lower ends of arms 700 and 706 is to provide means for supporting the pitting knives after they have traversed part way along the under side of the half pit and thereby compelling the blades to follow the under side outline of the half pit. If the rollers were not present, after contacting the under side of the half pit and pivoting about the common axis 656 the pitting blades would tend to move downwardly into the flesh of the half fruit beneath the pit and would dig very deep cuts into the flesh, which would be wholly undesirable. By suitably shaping the arc or curvature of the portion 757, see Figs. 47-51, when the pitter blades have moved arcuately approximately one-third of the distance, and this length is preselected and may be changed by altering the shape of the portion 757, around the under surface of the half pit, the arms 700 and 706 by such time will have swung upwardly sufficiently so that these cam-shaped portions 757 will have shifted to now rest upon the rollers, and from there on, during the subsequent swinging movement of the arms 700 and 706, these arms and hence the pitting blades will be confined to a circular movement which will closely follow the curvature of the under side of the half pit.

By reference to Figs. 2 and 39 of the drawings, it will be noted that when a half fruit is brought by the turret beneath the vertically shiftable pitting head, the pitting means 714 and 716 are positioned on opposite sides of the pit and that the pitting means moves about an axis substantially parallel with the longer or longitudinal axis of the pit, the blades conforming to the curvature of the pit that corresponds with this longitudinal axis. This is the preferred arrangement.

The half fruit holding means

Except for the size and round shape of the cups to accommodate peaches in lieu of pears as illustrated in the prior filed applications of Mark Ewald and except for the absence of grooves and except for a greater shallowness in the depth of these cups, their construction and operation is identical to the cup structures disclosed in said prior mentioned Ewald applications.

Figure 6:
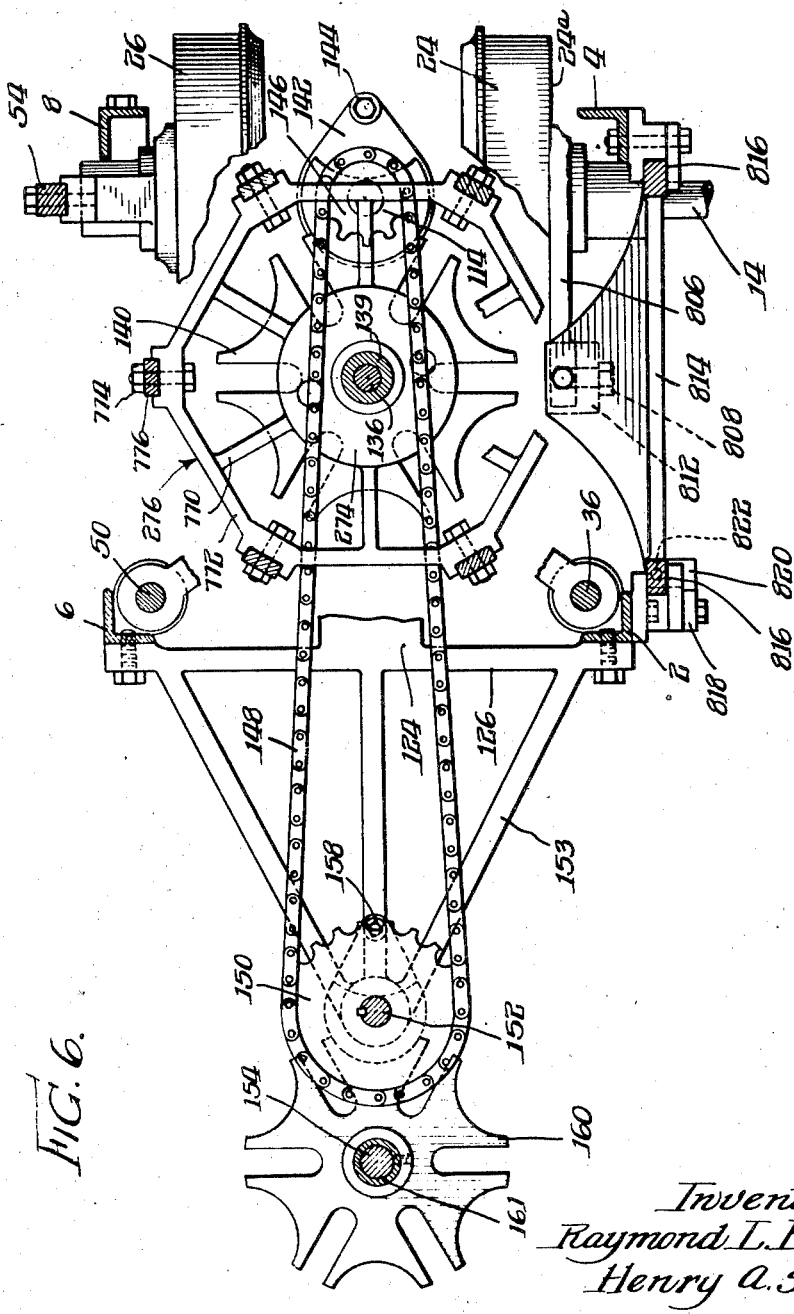
Figure 6 is a plan sectional view taken on line

Referring to Fig. 6, the turret disc 276 is provided with a plurality of radially extending spokes 770 uniting with a rim or web 772 forming an intermittently rotating spider. At equally spaced angular intervals about this spider the web is formed with a vertical countersink suitably bored and threaded to receive a bolt 774. The shank 776 of a half fruit holding means is thus removably mounted in each one of these countersinks on the web. In the present instance six half fruit holding means are so mounted. Each half fruit holding means preferably comprises a cup formed of two relatively hinged halves. One of the halves is stationary and is formed with the depending rigid shank 776 heretofore described as bolted to the turret web whereby to carry each complete cup intermittently to and past each operating station. The other half 780 of each cup is formed with rigid furcations 782 and 784. These furcations and the shank 776 of cup half 778 are provided with registering bores to receive a pivot pin 786, thereby pivotally holding the cup halves together in closed position or permitting the cup half 780 to swing outwardly from the fixed cup half 778.

In order to cause an opening movement of the cup half 780, it is provided with a rigid depending arm 788 formed with a lateral offset 790 carrying a roller 792 which is adapted to be contacted by a lug 794 on the bottom of an arm 796 on the peeler head, which does not form the subject matter of the present invention.

Operation

In the operation of the machine, from the motor 21, when the clutch control handle, shown in Fig. 1, is properly thrown to actuate the main driving shaft from the motor 21, the various shafts, including the two horizontal shafts 14 and 16 and the various reciprocable slides shown in Figs. 27 and 28, are put in operation, whereby not only to advance the feed-in turret 162 step by step but also through the instrumentalities of the driving means shown in Fig. 6 of the drawings to actuate the main turret 276 carrying the cups intermittently in synchronism with the feed-in turret. In addition thereto, the endless screw 178 for actuating the transfer jaws will likewise be actuated to carry these jaws back and forth between the feed-in turret and the stationary blade 464 adjacent the oscillatable spreader blades. In addition, through the cam 156 the rotating saw will be oscillated between the feed fingers 232 and 234 of the feed-in turret and the stationary plate 464 as shown in Fig. 3. Likewise, through the instrumentalities of the various slides hereinbefore described, including the slide 814, see Fig. 1, as hereinbefore described, the slide 814 in its up and down reciprocation carries not only the peeling platform and pitting platform but also carries the whole fruit extracting and discharge mechanism, so that as the slide 814 moves upwardly the pitting, peeling and discharging mechanism will move upwardly away from the fruit cups, whereby to permit the main turret intermittently to move and present a fresh pair of cups to the oscillatable spreader plates while at the same time carrying a cup with a half fruit disposed therein with its cut face uppermost in correct position beneath the peeling head, and simultaneously therewith to convey a cup carrying a half peach, which has been properly peeled, to the pitting station for the pitting operation, and at the same time carrying the cup which has heretofore been at the pitting station to the fruit discharging station; and in addition shifting the cup which has been at the fruit discharging station and from which the fruit has been discharged, leaving the peel and half pit therein, to the scavenging station. In addition, that cup which has been scavenged at the scavenging station in the prior cycle of operations will thence be moved to the fruit depositing station. Inasmuch as the main fruit cup holding turret will move twice as fast as the main feed-in turret moves, there will always be two empty cups at the half fruit receiving station to receive the half fruits from the spreader jaws.

Referring now to the details of operations, the operator standing at the end of the machine as shown in Figs. 1 and 3, as the jaws 232 and 234 of the intermittently operated feed-in turret come opposite to such operator, the jaws are in open position. A whole peach is inserted in position with its butt end abutting the stationary jaw 230 and with the stem cavity end facing outwardly. The maximum diameter of the fruit is centered in the central plane of the jaws 232 and 234. Prior to the next intermittent movement of the feed-in turret, the jaws 232 and 234 will be permitted to close by the action of the cam means 246 acting on rollers 250, plus the action of the springs 237, so that before the feed-in turret moves, these fingers will have closed upon the peach, each finger moving a predetermined amount, which is equal exactly to the predetermined movement of the other finger. In other words, these two fingers 232 and 234 always center the peach with respect to a horizontal plane, uniformly at the same horizontal elevation.

In the next intermittent movement of the feed-in turret, the fingers 232 and 234 carrying the whole peach are moved to the peach stem cavity slitting station and stopped thereat so that through the instrumentalities of the mechanism shown in Fig. 9, the nose 197 will find the peach cavity and will hold the peach cavity firmly and gauge the depth which the blades will cut, while the spaced slitting blades 204 will move upwardly on either side of the nose 197 to slit the side walls of the peach at the stem cavity, forming two substantially vertical, substantially elliptical slits therethrough. Subsequent to this operation, the feed-in turret will again move intermittently to convey the whole peach to the position shown in Fig. 3. At this time the rotating saw 250 will be oscillating toward the left so that the saw will thence cut through the peach stationarily held between the two stationary fingers 232 and 234. The saw, in cutting through the peach, will pass through the slots in these fingers and also through a slot in the stationary finger 230. These fingers 232, 234 and 230 are preferably arranged to permit a complete severance of the whole peach into two halves, while stationarily held between the fingers 232 and 234. However, in some instances it is desirable to have the saw 250 swing inwardly, cutting through the half peaches to such extent as completely to sever the pit and to sever entirely all the flesh of the fruit except a small segment thereof, as shown by the dotted lines in Fig. 3, in which case the unsevered portion will serve to hold the peach sections together until grasped by the transfer jaws to avoid possible dropping out of the feed jaws. This also permits the utilization of a relatively smaller saw. During this cutting of the peach, the feed jaws press in on the peach only from the top and bottom and adjacent a line passing centrally approximately through the pit, thereby tending to spread and thereby eliminating any pressing action of the sides of the peach against the saw blade and whereby to provide a cleaner cut and preventing pit dust from embedding in the peach. In addition, this same operation gives the pit dust opportunity to pass out of the peach and not become embedded in the flesh.

Upon the completion of the severing operation, and through the instrumentality of the endless screw 178, the transfer jaws have now arrived opposite the severed peach held between the fingers 232 and 234, except that the transfer jaws are in open position. At this time the transfer jaws are moved laterally inwardly due to the mechanism illustrated in Figs. 12 and 13, whereby resiliently to grasp the peach from opposed lateral sides and intermediate the zones from which the peach is held by the fingers 232 and 234. Due to the resilient mounting of these transfer jaws as shown in Fig. 12 and as hereinbefore described, the variations in half peach sections are resiliently taken up by the transfer jaws, it being noted, however, that due to the intermeshing of the gearing as shown in Fig. 12, each transfer jaw will be bodily moved the same distance, yet due to the resilient mounting of the lower portions of the jaws, such portions can resiliently move to accommodate thicker or thinner half peach sections.

Slightly after the grasping of the peach by the transfer jaws, the fingers 232 and 234 are now positively opened and the transfer carriage is then carried forward away from fingers 232 and 234 before the feed-in turret starts to turn intermittently, and the transfer jaws are then carried in a straight line motion, as shown in Fig. 3, carrying the half peach sections across the saw 250. It is desirable to give the transfer jaw a greater speed of movement than the speed of oscillation of the rotating saw to the right, so that if there be any uncut portion of the flesh of the peach which has not been completely severed by the saw when the peach is stationarily held between the jaws 232 and 234, this remaining portion will be severed by being conveyed past the toothed cutting edge of the saw.

The two half peaches in the transfer jaws 481 are now conveyed to the right, as seen in Fig. 3, directly onto the stationary spreader plate 464 which is directly in the plane of the saw 250 and the entering edge of which is substantially of the same width as the saw. The spreader plate, if desired, is slightly thicker at its rear than at its front, so as to slightly spread the half sections on the stationary spreader plate 464 and as they are held between the jaws. The transfer jaws 481, continuing to move, next carry the half sections directly onto the oscillatable spreader plates which in this stage of the operation are in vertical juxtaposition, as shown in Figs. 20 and 21, see particularly Fig. 21. In this movement the lower edge of the peach will contact the downwardly flared lip of the lower ledge of each spreader plate, while the upper periphery of each half peach will ride under the outwardly flaring lip 424 of each spreader plate, whereby resiliently to raise each clamping plate 414 of the spreader plate to permit the peach to be held on each vertical spreader plate between the lip 410 and this resilient clamping plate 414. This is shown in Fig. 21. At this time, through the action of the mechanism shown in Figs. 19–24, inclusive, the transfer jaws will move quickly outwardly at right angles to their direct line of travel, and after the jaws have so moved out, the spreader plates 386 and 388 will be shifted from a vertical position, shown in Fig. 21, to a horizontal position, shown in Fig. 19, it being noted that the outer ends of each spreader plate will move through a greater arc than the inner ends thereof. This is for the purpose of properly depositing one half peach into the radially aligned cups. In explanation, by reference to Fig. 2 it will be noticed that each cup has its central axis 390 radially of the vertical axis 136 of rotation of the main cup carrying turret, so that in order to prevent turning of a peach angularly from the parallel, straight line motion while carried in the transfer carriage, and while the half peaches are deposited onto the spreader plates and transferred thence to the cups, it is necessary to move the spreader jaws so that the peach pits will occupy the correct position in the peach cups when the cups carrying the half peaches with the pits are moved to the peeling and pitting stations. As the spreader plates are moved to downward horizontal position, through the action of the sector 328 intermeshing with the rack 372 and sector 330 intermeshing with the rack 376, and as the outer ends are moved arcuately through the action of the silent cams and rollers 392 and 394 running in the cam slots of the cam blocks 354 and 356, the trigger 426 of the releasing clamp will be opened by striking the angle plates 428 against the tension of the spring 422 to release the upper edges of the clamped peaches and at the same time the kicker discharge mechanism 430 will be actuated to positively kick the half fruit into the registering cups which are now immediately below the horizontally disposed presser plate by striking on the stop 438. It will be noted that during the transfer of the fruit sections by the transfer jaws, each fruit section is held in a predetermined plane by means of the relatively small pointed blades 518 and 520, see Fig. 12.

The action of the kick-off mechanism and of the trigger is accomplished by the stationary stops 428 and 438 as hereinbefore described.

Upon the depositing of each half fruit section in its cup, this being done simultaneously for the two half sections, the main feed turret carrying the cups will move in a counter-clockwise direction, as seen in Fig. 2, carrying one of said cups having a half fruit therein with its cut face uppermost and with the pit unsevered from the flesh thereof to the peeling station as shown in Fig. 2. Simultaneously the spreader plates will be swung back to vertical position to receive a subsequent severed whole peach.

Upon the arrival of the half fruit at the peeling station, in synchronized sequence the peeling head will descend through the operation of the slide 814. By reference to Fig. 29, upon the descent of this peeling head the half peach will be held in the cup, the two cup sections being in closed position at this time. The presser foot 910 will be resiliently brought down upon the cut face of the half fruit, the ejector foot 914 moving resiliently upwardly into the chambered presser foot. The reversed locking mechanism will then lock the presser foot in this adjusted position and in proper timed sequence the peeling knife, as shown in Fig. 31, will swing downwardly through the cup between the inner wall of the cup and the margin of the presser foot 910, whereby to start the peeling of the peach. As the peeling knife reaches the bottom of the righthand sector 780, and through the action of the arm 788 on the shiftable cup section, the latter will be thrown open and through the action of the blunt bevel outer edge of the peeling knife, the same being constructed in accordance with the disclosure in the Mark Ewald application, Serial No. 750,151, filed October 26, 1934. The blunt edge on the outer face of the peeling knife is formed at such an angle as to cause the knife not only to peel the fruit but likewise to force the half peach bodily toward the right, as seen in Fig. 31, whereby to cause the outer wall of the peach snugly to fit against the inner wall of the movable section 780. In explanation, during the downward movement of the knife the two body sections have been forced together whereby firmly to force the half peach against the inner wall of the stationary section of the cup so as to cause the peeling knife always to pass through the peach at a uniform distance from the inner wall of the half fruit. Then as the knife reaches the bottom zone of the stationary section of the cup, the movable section of the cup will then open to a position such that its inner wall is exactly concentric with the center axis of the cup, and at this time the outer blunt face or inclined face of the peeling knife is formed at the proper angle, as disclosed in the aforementioned application, so as to force the half peach bodily over and firmly against the inner wall of the now shifted cup section so that the inner wall will present a true concentric continu-tion of the inner stationary wall of the cup, so that the peeling knife in its continued movement will swing upwardly through the peach, always at a uniform distance so as always to take the uniform thickness of peeling from the peach.

Due to the fact that in the subsequent pitting operation it is necessary to have a more shallow cup in order to permit the presser plate to flatly contact the cut face of the half peach as it comes down, and since the sections of half peaches are of variant size, it is necessary to have a shallow cup so that the presser plate will not contact the rim of the cup. In order to prevent the peeling knife, as it swings upwardly through the section 780 of the cup, from breaking off the flesh at the margin of the cup, it is necessary to reinforce the outer periphery of that portion of the peach which extends above the cup wall at this point. Therefore it will be noted that the reinforcing lip or rim 880, which is carried upon the peeling head, when the peeling head descends to peeling position will exactly coincide with the outwardly moved position of the cup section 780 and will form a continuation thereof, and that the peeling knife in swinging upwardly will act against this continuation, which reinforces the peach at this point.

Upon the completion of the peeling operation the peeling head will move upwardly in timed relation; the presser foot, being carried by the peeling head, will move upwardly, leaving the discharge foot 914 in contact with the sticky surface of the severed pit, thereby breaking any vacuum or adhesion between the presser foot 910 and the sticky surface of the half peach. As the peeling head continues to move upwardly, the presser foot is the last to be removed from the half peach. Upon the upward movement of the peeling head, the mechanism is unlocked for subsequent movement. When the peeling head has cleared the cups in the turret on its ascent, the turret is then given an intermittent motion in a counter-clockwise direction to carry the cup containing the peeled half fruit to the pitting station, as shown clearly in Fig. 2. At this station, the peeled half peach, lying on its severed peeling and lying in the cup, is brought under the pitting head and the releasing arm 788 has been removed from contact with the trigger 794 so that the sections of the cup grasp the half peach with its pit uppermost.

At the pitting station, when the slide 814 descends, the pitting head is brought downwardly, somewhat in the position shown in Fig. 32. The pitter gauge plates 770 and 772 are suspended by means of the slotted members 780 and 782, which in turn are slidably mounted on the stems 790 and 792. The members 780 and 782 have their adjusting screws 806 and 808 for the purpose of setting the gauge plates to a position where the points 786 of the pitting blades will extend below the peach contacting surface of the gauge plates a sufficient distance to insure contact with the pit as the blades close in to start the severing of the pit from the flesh of the fruit.

The blades must be opened a predetermined distance so that the cutting edges will always be away from the pit as the blades come down to sever the pit from the peach. The pitting blades, after contacting the cut flesh of the half fruit, must drag across the face of the fruit until they come to the pit before any cutting action of the blades takes place. The cutting blades are first opened by the upward movement of the arms 736 and 738. The predetermined distance of opening is governed by the slots 704 and 709. This is because the arms are parts of the sleeves 728 and 730 which carry the pitting blades, and since the ends of the slots come in contact with the shafts 656 and 664, no further outward movement of the pitting blades can take place. Upon descent of this pitter head, the gauge plate sections 662 are moved downwardly until they contact the cut face of the half peach, the cut face projecting above the upper rim of the cup sections. This downward movement through the proper adjustments heretofore described adjustably positions the points 786 slightly into the cut face of the half fruit on each side of the pit and in spaced relation therefrom.

Upon the actuation of the pitting arm 736, as hereinbefore described in detail, each pitter blade will swing about its individual pivotal axis 678 and 698, as shown in Figs. 47–51, thereby causing the blades to drag or move laterally across the cut face of the half fruit, the points digging only slightly into the cut face of the half fruit. To insure that the pitter blades preliminarily swing about their own individual pivots 678 and 698, the bevel gears 668, 679 and 686, together with spring 684, operate as follows: the spring 684 sets up on the shaft 640 and the pinion 679 keyed thereto a torsional urge which tends to turn the pinion. This turning is transferred through the pinion to the two intermeshing bevel gears 668 and 686. Bevel gear 686 is keyed to its sleeve 692 which is a part of the lever 694. This arrangement transmits the turning urge from the spring 684 to the lever 694, thereby creating a resistance to turning of the arm 694 about the fulcrum through the shaft 664. Bevel gear 668 creates a resistance to the turning of the arm 674 in the same manner but in the opposite direction. Since resistance has been set up to keep the arms 674 and 694 from turning about the fulcrum through shafts 664 and 656, the sleeves 728 and 730 will turn about the shafts 678 and 698, see Fig. 47, until the cutting edges of the pitting blades engage the pit. Now, since the pit offers a greater resistance than the spring urge from spring 684, the urge is overcome and the arms 674 and 694 turn about the fulcrum through shafts 664 and 656, thereby compelling the pitting blades to complete the cut around and under the pit. The bevel gears also function to compel the cutting blades to move about the pit at a uniform rate of speed whereby to insure a uniform cavity when the pit has been removed, by acting as stabilizers between the two arms. Since the gears 686 and 668 are meshed with the pinion 679, and since the arms 674 and 694 are keyed to the stems of these gears, the arms 674 and 694 must turn uniformly together about the common fulcrum through shaft 664.

The pit locating movement of each pitting blade brings each blade into contact with the outer curved wall of the pit at a point slightly below the cut face of the pit. At this time the blades form fulcrum points which thereafter causes each blade not to swing about its axis 678 and 698 but to swing about a common axis 656, which axis instead of being remote from the cut face of the half peach as are the axes 678 and 698, is relatively close to the cut face of the half fruit. At this point the slot in each arm 700, 706 will shift with respect to the axial portion 656 so that as the end of each slot is reached by each respective shaft, the bottom portions of the arms 700 and 706 will have contacted the upper surfaces of the rollers 652 and 654. In other words, this contacting action takes place when the pitter blades have moved slightly less than one-third around the under surface of the pit. At this instant it is important that the pitter blades be supported so that they will swing in true circles about the axis 656 and snugly and closely follow the under wall of the pit until they meet at a point centrally of the under surface of the pit, thereby in their overlapping meeting completely severing the pit; for if these arms were to drop down they would be permitted to open, whereas it is necessary to keep them together to complete the severance of the under side of the half pit along the line closely following the outline of the pit. By inspection of Figs. 56–56 it will be noted that through the bevel gearing and the action of the spring 684, the spring serves to keep the arms 700 and 706 substantially together vertically or in their uppermost position and provides sufficient spring resistance, greater than the drag of the pitter blades across the face of the fruit flesh until the time of contact of the blades with the pit, which offering greater resistance to the further movement of the pitter blades, the spring resistance is now overcome and the pit forming the stopping movement of the blades, the blades will then start down through the flesh, which causes the arms now to swing about the central or common axis 656 instead of their own separate axes 678 and 698 as heretofore. The bevel gears 668 and 679 and 686 cause the blades to move uniformly through the cutting stroke; that is, they tend to prevent one blade running ahead of the other in the cutting, all as hereinbefore described.

In the preferred embodiment of the construction of the present application, the peach is raised slightly out of the cup after the pitting blades have started cutting under the pit, which action creates a downward pressure or force on the peach by the presser or gauge plates equal in intensity to the weight of these plates 662 and the weight of the end castings 780 and 784 secured thereto. While this lifting action at this point in the cutting operation is not wholly necessary in so far as the actual severing of the pit is concerned, it does tend to eliminate marring or bruising of the fruit during the pitting operation.

The mechanism for raising the carriage that vertically shifts the pitting head carrying the pitting blades is the same mechanism that raises the slide 814. The cam race 804, see Fig. 26, is so designed that the slide 814 is maintained in downward position sufficiently long for the peeling knife, the fruit extractor and the peeling scavenger to have completed their work before the said slide 814 starts to raise. In certain constructions the cam race 804 is constructed and arranged so that after the slide has moved to position the pitting head to start the pitting cut as hereinbefore described, and during which time the pitting knives have begun their cuts in approaching directions around the under side of the pit, the slide is raised about ⅝ inch and then held there until the pitting blades have finished their cut, at which time the slide is then raised the full amount to clear the turret in its next intermittent turning movement. This raising of the pitter head slightly out of the cup after the pitting blades have started cutting under the pit causes the creation of a downward pressure or force on the peach by the presser or gauge plate as hereinbefore described.

In another design or construction of the cam race 804, the race is formed so as to make one gradual rise of the slide in its upward movement, which upward movement includes a portion of the finishing operation of the pitting cut. By this modification in the operation of the machine, a much smoother running machine is provided and at the same time there is secured the same effect of causing the pitting blades, as the pitting head rises, to tend bodily to lift the pit, due to the fact that the pitting knives have moved around and beneath the curved walls of the pit while at the same time the presser or gauge plate is still, by its weight, pressing downwardly solely on the flesh of the half peach and not on the pit, which as hereinbefore described causes the pitting knives more closely to follow the curved under walls of the pit so as to cut the minimum of flesh from the half peach during the pitting operation.

The spring 684 on the pitting head serves the sole purpose of controlling the movement of the pitting blades prior to the time when the blades enter the fruit to pass down under the pit. This spring sets up an urge which makes it possible for the points of the pitting blades to drag across the face of the fruit to locate the pit before turning commences to send the blades down around the pit. Should this spring be left off, the resistance of the drag set up by the points on the pitting blades would be greater than the resistance to the cutting edges of the blades, and they would therefore start cutting into the fruit before reaching the pit.

The invention is hereby claimed as follows:

1. A device for pitting a half fruit having a pit section disposed in its cut face unsevered from the half fruit, comprising means for supporting the half fruit with its cut face and pit section exposed, a pair of pit cutters each having a cutting edge conforming generally to the elongated curvature of the pit section, means for advancing the cutting edges substantially at right angles to the fruit to cause said edges slightly to penetrate into the cut face thereof at a distance from the margin of the pit section and for then simultaneously moving said cutting edges substantially parallel to the cut face of the fruit into contact with the edge of the pit section slightly under the cut face of the half fruit, and means for thereafter moving the cutting edges along the curved under surface of the pit at equalized speeds to sever the pit.

2. A device for pitting a half fruit having a pit section disposed in its cut face and unsevered from the half fruit, comprising means for supporting the half fruit with its cut face and pit section exposed, a pair of pit cutters each having a cutting edge conforming generally to the elongated curvature of the pit section, means for advancing the cutting edges substantially at right angles of the fruit slightly into the cut face thereof at a distance from the margin of the pit section and for then simultaneously moving said cutting edges substantially parallel to the cut face of the fruit into contact with the edge of the pit section slightly under the cut face of the half fruit, and means for moving the cutters along the under surface of the pit in true circular paths to sever the pit.

3. A device for pitting a half fruit having a pit section disposed in its cut face and unsevered from the half fruit, comprising means for supporting the half fruit with its cut face and pit section exposed, a pair of pit cutters each having a cutting edge conforming generally to the elongated curvature of the pit section, means for advancing the cutting edges substantially at right angles of the fruit slightly into the cut face thereof at a distance from the margin of the pit section and for then simultaneously moving said cutting edges substantially parallel to the cut face of the fruit into contact with the edge of the pit section slightly under the cut face of the half fruit, and means for moving the cutters along the under surface of the pit in true circular paths to sever the pit, said means including mechanism to compel said cutters to move at equalized speeds during their movement along the under surface of the pit.

4. A device for pitting a half fruit having a pit section disposed in its cut face unsevered from the half fruit, comprising means for supporting the half fruit with its cut face and pit section exposed, a pair of pit cutters each having a cutting edge conforming generally to the elongated curvature of the pit section, means for advancing the cutting edges substantially at right angles of the fruit slightly into the cut face thereof at a distance from the margin of the pit section and for then simultaneously moving said cutting edges substantially parallel to the cut face of the fruit into contact with the edge of the pit section slightly under the cut face of the half fruit, and means including gearing drivingly interconnecting the pitting blades for causing said blades to travel at equalized speeds as they move in approaching directions through the flesh of the peach along the under side of the pit, whereby to sever the pit.

5. The combination of a recessed fruit holder for holding a half fruit with its cut face uppermost, a pitting head mounted thereover and shiftable into pitting position relative to the fruit holder, a pitting frame vertically slidable on the head and carrying shiftable pitting means thereon having fruit contacting surfaces adapted to rest on the cut face of the half fruit on opposite sides of the pit of the half fruit, said frame being supported from the pitting head by means of two springs, one at each end of the frame, said pitting mechanism including gearing at one end of said frame for actuating the pitting means, and means for adjusting the tension of each spring so as to balance the weight of the pitting frame at each end upon the face of the cut fruit.

6. In combination, fruit holding means adapted to receive and hold a half peach with its cut face uppermost, pitting mechanism therefor including a vetrically reciprocating carriage having depending furcations providing vertical guideways, a pitting frame slidably mounted in said guideways having spaced portions, pins passing through registering bores in the frame and provided with stops on their under surfaces whereby to support the top of said frame, compression springs for resiliently supporting said frame from said carriage whereby to balance the frame on the carriage, said frame being in the form of an inverted yoke comprising a horizontal cross portion and two vertical legs, each leg being provided with a cross bearing, the bearing of each leg supporting a shaft, the innermost portion of each shaft being provided with a flattened portion having opposite vertical sides forming a guide, a presser plate having a central opening somewhat larger than the cross section of the pit of the half fruit whereby the inner walls of said opening are spaced from the marginal walls of the pit, said presser plate having upstanding blocks providing vertical guideways adapted slidingly to receive the flat vertical sides of the guides on each end of the opposed shafts, one of said shafts having pinned thereto a bevel gear and a collar having a lever attached thereto, the upper end of said lever having a cross shaft pinned thereto, a bevel pinion meshing with said bevel gear, said bevel pinion being fixed upon a shaft extending normally to said last mentioned shaft, a tension spring disposed between said bevel pinion shaft and a fixed support, a sleeve surrounding said second mentioned cross shaft, a third bevel gear pinned to said sleeve and meshing with said bevel pinion, a collar fixed to said sleeve, said collar having a lever fixed thereto, a second cross shaft fixed to said second mentioned lever and running parallel to said first mentioned cross shaft, each of said shafts having a long sleeve loosely surrounding it, each of said sleeves having intermediate its length a depending arm, a pitter blade fastened to the bottom portion of each arm, said pitter blades in one position registering with the opening in said presser plate, power means interconnected to each of said sleeves for actuating said sleeves to cause oscillatory movement of said pitting blades, each of said sleeves having an integral arm depending therefrom, each arm having on its bottom an enlargement provided with an elongated slot through which passes one of the fixed extension shafts, and a stationary roller underlying each slotted enlargement whereby to limit the downward movement of said slotted enlargement on oscillatory movement of each pitter blade.

7. In a device for pitting peaches, the combination of means forming a turret adapted intermittently to rotate in a horizontal plane, said turret having a plurality of spaced apart, recessed fruit holders adapted to support a half fruit with its cut face uppermost and its pit exposed, a pitting head adapted vertically to reciprocate, a block vertically shiftable on said pitting head, power means for reciprocating said pitting head and said block independently, a pair of vertically shiftable arms, said block having a pair of pins, each of said arms having a vertical slot connected with one of said pins, said head having a frame resiliently vertically slidable therein, said frame having opposed bearings, a cross shaft in each bearing, said cross shafts being coaxial and disposed in fixed position relatively to the frame, a pair of bearings on each of said coaxial shafts, a cross member connecting one of each of said pair of bearings, loose sleeves surrounding each of said interconnecting shafts, a connection from one of said slotted arms to each of said loose sleeves, a depending pitter blade carried by each one of said loose sleeves intermediate the length of the sleeve, a depending lever connected to each one of said loose sleeves, the lower portion of each lever being provided with a horizontal elongated slot, the slot of one of said levers surrounding one of said coaxial cross shafts and the slot of the other of said levers surrounding the other of said coaxial cross shafts, a stationary roller underlying the under side of each lever having such elongated slot whereby to prevent movement of each of said levers below a predetermined horizontal plane, a presser plate having a central aperture adapted to be positioned in registration with the pit of a half fruit, said aperture being somewhat larger than the cross section of the pit, said presser plate having a pair of opposed upstanding guides each provided with registering vertical guideways, each of said coaxial shafts having on its end a block provided with vertical guides adapted to move vertically with respect to the vertical guideways of the presser plate, adjusting means carried by said presser plate engaging the under side of each of said coaxial shafts whereby said presser plate has vertical shiftable movement with respect to said pitter frame and said pitter frame having resiliently vertical shiftable movement with respect to said pitter head, and means providing a gearing interconnection between said pitter blades, said connection including spring means tending normally to maintain said pitter blades in vertical position with the blades at their maximum spread apart opening.

8. In an automatic machine for pitting peaches, the combination of means providing a horizontally disposed, intermittently rotating turret provided with a plurality of spaced apart recessed holders for receiving half peaches with their cut faces uppermost, a pitter head adapted for reciprocation vertically toward and from the recessed holding means in synchronized movement therewith, said pitter head including a pair of pitter blades, means for intermittently moving said turret to bring a fruit holder to a pitting station, means for causing vertical downward movement of the pitting head into juxtaposition with the fruit holder, gauge means carried by said pitting head comprising a flat surface adapted to be brought into contact with the cut face of the peach while held in the fruit holder, said gauge means having an aperture therein considerably larger than the pit of the half fruit, said pair of pitting blades shiftably mounted on said pitter head, and means for automatically causing said pitter blades to be projected into contact with the cut face of the half fruit on opposite sides of the pit and thereafter to be moved laterally across the cut face of the half fruit into contact with the marginal edges of the pit, including mechanism for thereafter causing said blades simultaneously to cut through the flesh of the half fruit around the under side of the pit whereby completely to sever the pit therefrom.

9. In an automatic machine for pitting peaches, the combination of means providing a horizontally disposed, intermittently rotating turret provided with a plurality of spaced apart recessed holders for receiving half peaches with their cut faces uppermost, a pitter head adapted to reciprocation vertically toward and from the recessed holding means in synchronized movement therewith, said pitter head including a pair of pitter blades, means for intermittently moving said turret to bring a fruit holder to a pitting station, means for causing vertical downward movement of the pittting head into juxtaposition with the fruit holder, gauge means carried by said pitting head comprising a flat surface adapted to be brought into contact with the cut face of the peach while held in the fruit holder, said gauge means engaging opposite sides of the cut face spaced from the pit of the half fruit, said pair of pitting blades shiftably mounted on said pitter head, means for automatically causing said pitter blades to be projected into contact with the cut face of the half fruit on opposite sides of the pit and thereafter to be moved laterally across the cut face of the half fruit into contact with the marginal edges of the pit, including mechanism for thereafter causing said blades simultaneously to cut through the flesh of the half fruit around the under side of the pit whereby completely to sever the pit therefrom, and means during a portion of said pit severing movement of the blades to cause said pitter head to move upwardly, leaving the gauge means in the cut face of the half fruit whereby to cause the pitter blades to follow the peripheral edges of the pit more closely in the pit severing operation.

10. In an automatic machine for pitting half peaches, the combination of means providing a succession of fruit holders for receiving and holding a half peach with its cut face and pit exposed, means for intermittently moving said fruit holders to bring a fruit holder to a pitting station and to position the same in a horizontal plane thereat, a pitting head disposed at said station and adapted to be disposed above said fruit holder at said station, means for synchronously moving the pitting head into pitting position downwardly towards said fruit holder, said pitting head including fruit holding means adapted to be projected into contact with the cut face of the half fruit on opposite sides of but removed from the pit section, means providing relative motion between said pitting head and said holding means, pitting means shiftably mounted on said pitting head, and means synchronized with the downward movement of said pitting head and the contacting movement of said holding means on the cut face of the half fruit for shifting said pitting means to cause the same to shift laterally across the cut face of the half fruit from a point removed from the marginal edge of the pit into contact with the margin of the pit, and thereafter to cut through the flesh of the fruit around the margin of the pit to sever the pit from the half fruit.

11. In a device for pitting half fruit, the combination of means forming a horizontally disposed turret having spaced apart fruit holders thereon, means for intermittently moving said turret to intermittently position each one of said fruit holders in succession at a pitting station, pitting mechanism adapted to be shifted during the dwell in the intermittent movement of said turret for shifting the pitting head toward a fruit holder, means synchronized with the dwell in the movement of the turret for so shifting said pitting head, a pair of pitting cutters mounted on said pitting head and mounted to overlie the severed face of the half fruit in the fruit holder, means synchronized with the movement of the pitter head shifting mechanism for moving the cutters from one position, in which the cutting edges thereof are spaced apart and engage the face of the half fruit at opposite sides of the pit, to a position at which said edges are together and in the fruit, means synchronized with the movement of the machine for mounting the cutters whereby on initiation of the movement from said first position to the second, the cutting edges will be caused to embrace the pit before substantial penetration of the edges into the fruit, and means arranged for coaction with the fruit for urging said cutters in embracing relation with the sides of the pit.

12. A device for pitting a half fruit having its pit section disposed in the cut face unsevered from the half fruit, comprising means for supporting the half fruit with the cut face and pit section exposed, a pair of pit cutters each having a cutting edge conforming generally to the elongated curvature of the pit section, means for advancing the cutters into contact with the cut face of the half fruit and with the cutters disposed on opposite sides of the pit section and each laterally removed from the marginal edge of the pit section, means for independently advancing the cutting edges of each cutter substantially at right angles to the cut face of the fruit and while each cutter is in contact with the cut face of the half fruit whereby to cause each cutter independently to engage the marginal edge of the pit, and means for thereafter causing said cutters simultaneously to move with equalized speeds in approaching directions around the curved walls of the pit substantially at the juncture of the said curved walls and the flesh of the half fruit, said cutters moving until they substantially contact, whereby to sever the pit section from the half fruit.

13. A device for pitting a half fruit having a pit section disposed in its cut face unsevered from the half fruit, comprising means for supporting the half fruit with its cut face and pit section exposed, a pair of pit cutters each having a cutting edge conforming generally to the elongated curvature of the pit section, means for positioning the cutters into contact with the cut face of the half fruit on opposite sides of the pit section and for moving either cutter laterally across the cut face of the half fruit into contact with the edge of the pit while the other cutter remains at rest, including means for thereafter moving both cutters simultaneously and at equalized speeds around the uncut, curved walls of the pit section to sever the same from the flesh of the fruit.

14. In a device for pitting half fruit, the combination of means for holding a half fruit with its cut face uppermost and with a pit section unsevered therefrom, a pitting head movable relatively toward the half fruit holder and adapted relatively to be positioned with respect thereto, a pair of swingable pitter blades shiftably mounted on said pitter head, an apertured gauge plate shiftably mounted on said pitter head and through the aperture of which the pitter blades are adapted to operate in pitting the half fruit, means for positioning the gauge plate in flat contact with the cut surface of the half fruit with the pitter blades on opposite sides of the pit and with the bottom edges of the pitting blades projecting slightly into the cut face of the half fruit, and means for adjusting said depth of projection of the lower surface of the pitter blades below the under surface of the gauge plate.

15. In a device for pitting a half fruit, means adapted to hold a half fruit with its cut face exposed and with a pit section unsevered therefrom, a carriage adapted to reciprocate toward and from the half fruit holding means, means for reciprocating said carriage, a frame shiftably mounted on said carriage, a pair of pitter blades shiftably mounted on said frame, actuating means for swinging the pitter blades, a gauge plate shiftably mounted on said frame and relatively to said pitter blades, and means for reciprocating the carriage into proximity to the fruit holder, including means for contacting the gauge plate with the cut surface of the half fruit with the lower surface of the pitter blades projecting below the under surface of the gauge plate into contact with the cut face of the half fruit on opposite sides of the pit section, means for adjusting the depth of penetration of said pitter blades below the under side of the gauge plate, means providing relative movement of said carriage with respect to said frame whereby adjustably to accommodate half fruit of varying thicknesses held in the fruit holders and operated upon by the pitting means.

16. In a device of the class described, the combination of means providing a fruit holder adapted to receive and support a half fruit with cut face uppermost and with the pit section exposed, a vertically shiftable carriage adapted to be positioned over the holding means, means for vertically shifting the carriage toward and from the holding means when so positioned, a frame vertically shiftable on said carriage and resiliently supported thereupon, a pair of swingable pitting cutters mounted on said frame and adapted to operate through an aperture on said frame, a gauge plate mounted on said frame and vertically and adjustably shiftable with respect thereto, means for vertically shifting the carriage toward and from the fruit holder to position the pitting blades through the aperture of the gauge plate into contact with the cut face of the half fruit on opposite sides of the pit section, means for actuating the pitting blades, and means for permitting the frame resiliently to rise with respect to the carriage when a half fruit of larger size is contacted by the presser plate, the operating connections to the pitter blades including mechanism for accommodating the rise of said frame.

17. In a device of the class described, the combination of means providing a half fruit holder adapted to receive and hold a half fruit with its cut face exposed and with the pit section unsevered therefrom, means forming a pitter carriage adapted to have relative shifting movement so as to be positioned adjacent the holder or away from it, a frame shiftably mounted on said carriage including co-axial, stationary and turnable shafts spaced apart thereon, a pair of pitter blades each having a pair of bearings, one of said bearings being mounted on the stationary shaft and the other being mounted on the turnable shaft, power actuating means for said pitter blades, and gearing associated with said rotatable shaft for permitting independent movement of either of said pitter blades while the other pitter blade is at rest and alternatively causing equalized swinging movements of said pitter blades when severing the pit section from the flesh of the half fruit.

18. In a device for pitting half fruit, the combination of means providing a horizontally disposed turret having a plurality of spaced-apart holders for half fruit mounted thereon adapted to intermittently rotate in a horizontal plane upon the rotation of the turret, a pitter carriage mounted to operate in a vertical plane above the plane of rotation of the fruit holders, means for vertically reciprocating the pitter carriage, said reciprocations being in timed sequence to the intermittent movement of the fruit holders, a frame resiliently mounted on said carriage for vertical movement relatively to said carriage, means forming an apertured gauge plate of greater area than the fruit holding means, an aperture in said gauge plate being substantially larger than the pit section of a half fruit whereby to permit the aperture to register with the pit section irrespective of the eccentricity of position of the pit section in a succession of various half fruits when placed in the respective holders, means for actuating the turret interruptedly whereby successively to bring the half fruit of the successive holders in registration with the aperture in the gauge plate and for shifting the carriage to position the gauge plate into contact with the cut face of each half fruit, means mounted on said gauge plate and interconnecting with means on said frame for permitting relative shifting movement between the gauge plate and the frame, means on said frame providing co-axial, pivotal axes, and pitting means shiftably mounted on said frame and adapted in shifted position to swing through the aperture of the gauge plate to cut through the flesh of the half fruit to sever the pit therefrom, and means actuated in synchronism with the registration of the gauge plate with the pit section of a half fruit for actuating the pitting means to cause the same to swing through the aperture of the gauge plate to sever the pit therefrom.

19. In a device for pitting half fruit, the combination of a support, means forming a pitting station, a series of half fruit holders adapted to be intermittently brought to said pitting station and each adapted to receive a half fruit with its cut face exposed with the pit section unsevered therefrom, a carriage at said pitting station, a frame or support on said carriage, a pair of co-axial shafts on said frame, a gauge plate having a central aperture of greater cross section than the cross section of the pit, means for mounting said gauge plate from the central portion of said shafts whereby the central portion of the aperture of said gauge plate coincides with the co-axes of said shafts, means for positioning a succession of fruit holders centrally in registration with the aperture in the gauge plate, whereby the pit sections will be exposed through the aperture of the gauge plate irrespective of the eccentric disposition of the pit sections in successive half fruits in successive holders, pitting means shiftably mounted on said frame and power actuating connections synchronized with the registration of a fruit holder with said gauge plate for shifting said gauge plate into contact with the cut face of a half fruit and with the pitting means in contact with the cut face of the half fruit to one side of the pit section irrespective of its eccentricity and means for thereafter shifting the pitting means laterally along the cut face of the half fruit into contact with said pit section, and for thereafter swinging said pitting means around the curved wall of the pit section to sever the same from the half fruit.

20. In a device for pitting half fruit, the combination of a support, means forming a pitting station, a series of half fruit holders adapted to be intermittently brought to said pitting station and each adapted to receive a half fruit with its cut face exposed with the pit section unsevered therefrom, a carriage at said pitting station, a frame or support on said carriage, a pair of co-axial shafts on said frame, a gauge plate having a central aperture of greater cross section than the cross section of the pit, means for mounting said gauge plate from the central portion of said shafts whereby the central portion of the aperture of said gauge plate coincides with the co-axes of said shafts, means for positioning a succession of fruit holders centrally in registration with the aperture in the gauge plate, whereby the pit sections will be exposed through the aperture of the gauge plate irrespective of the eccentric disposition of the pit sections in successive half fruits in successive holders, a pair of pitters mounted on said shafts and adapted to be positioned through the aperture of said gauge plate when the latter is in contact with the cut face of the half fruit with the pitter blades projecting into the cut face of the half fruit on opposite sides of the pit section and spaced therefrom, and means providing a lost motion connection between said shaft and said pitter blades and for operatively actuating said pitter blades to cause either or both to move laterally across the cut face of the half fruit into contact with the edge of the pit and thereafter to cut through the flesh of the fruit to sever the pit therefrom.

21. In a device for pitting half fruit, the combination of a support, means forming a pitting station, a series of half fruit holders adapted to be intermittently brought to said pitting station and each adapted to receive a half fruit with its cut face exposed with the pit section unsevered therefrom, a carriage at said pitting station, a frame or support on said carriage, a pair of coaxial shafts on said frame, a gauge plate having a central aperture of greater cross section than the cross section of the pit, means for mounting said gauge plate from the central portion of said shafts whereby the central portion of the aperture of said gauge plate coincides with the coaxes of said shafts, means for positioning a succession of fruit holders centrally in registration with the aperture in the gauge plate, whereby the pit sections will be exposed through the aperture of the gauge plate irrespective of the eccentric disposition of the pit sections in successive half fruits in successive holders, and a pair of pitter blades including an arm for each blade, each arm having an elongated slot mounted upon a shaft, and power actuated means for shifting said arms and blades first about a pivot removed from said co-axial shaft and thence about said co-axial shaft as a common pivot, said mechanism including means for causing said arms to move with equalized speeds when moving about said coaxial shaft.

22. In a device of the class described, the combination of a support, an intermittently operating turret thereon having a plurality of spaced apart fruit holders each adapted to receive a cut fruit with its cut face uppermost and with its pit section unsevered therefrom, a carriage reciprocably mounted on said support above the turret, a supporting frame on said carriage including a pair of coaxial, spaced apart shafts, a pair of pitting blades mounted on said shafts, an apertured gauge plate mounted on said shafts for relative movement with respect thereto and through the aperture of which said pitting blades are adapted to operate, means for reciprocating said carriage to position the gauge plate in contact with the cut face of a half fruit when a fruit holder is in registration therewith, with the pitting blades in contact with the cut face of the half fruit on opposite sides of the pit section and removed therefrom, power actuated connections synchronized with the movement of the carriage and the period of rest of the fruit holder for first shifting the carriage into contact with the cut face of the half fruit and for thereafter shifting the pitting blades to cause them to move into contact with the edge of the pit and thence to swing downwardly around the under side of the curved under wall of the pit section, and means, as said pitting cutters approach each other, to cause the pitting carriage to rise, thereby lifting the half fruit upwardly from the fruit holder so as to cause the weight of the gauge plate assembly to exert a force or pressure downwardly on the flesh only of the half fruit at its cut face in a direction away from the cutting action of the pitter blades whereby to effect a cut close to the under surface of the pit.

23. A pitting blade comprising a main body portion having integrally formed therewith a relatively narrow blade member curved laterally out of the plane of the body and provided with a relatively large opening, the lower portion of the curved body being provided with an elongated cutting edge conforming somewhat to the elongated curvature of a peach pit, the cutting edge being provided with a point located in the same plane of the curved portion of the blade, the opening in the blade being of sufficient size to permit the maximum curvature of the wall of the pit to pass or project therethrough during the pitting action, thereby eliminating tearing action.

24. A pitting blade for a peach pitting device, comprising a main body portion having means for attachment to a power-operated pitting mechanism, the body portion being integrally formed with a laterally or outwardly extending curved portion, the lower edge of which is sharpened to provide a cutting edge, the elongated curvature conforming generally to the elongated curvature of the pit of a peach, said curved body portion having a centrally disposed, large opening of sufficient extent to permit the maximum curvature of the pit wall to project therethrough during the pitting action.

25. A pitting blade for a peach pitting device, comprising a main body portion having means for attachment to a power-operated pitting mechanism, the body portion being integrally formed with a laterally or outwardly extending curved portion, the lower edge of which is sharpened to provide a cutting edge, the elongated curvature conforming generally to the elongated curvature of the pit of a peach, said curved body portion having a centrally disposed, large opening of sufficient extent to permit the maximum curvature of the pit wall to project therethrough during the pitting action, the cutting edge of the pitter being provided with a centrally located point projecting beyond the remaining cutting edge of the pitter of the blade, said point being disposed in the plane of the cutting edge.

26. In a device of the class described, the combination of means forming a holder for receiving and holding a half fruit with its cut face uppermost and its pit section exposed, means adapted to contact the cut face of the half fruit on opposite sides of the pit section and spaced therefrom for holding the half fruit in its holder during the pitting operation, a pair of pitting blades having cutting edges conformed to the longitudinal curvature of the pit and adapted to be positioned on opposite sides of the pit in contact with the cut face of the half fruit, and means for positioning each of said blades into contact with the peripheral edge of the pit at the cut face and for arcuately shifting said blades downwardly around the under surface of the pit through the flesh of a fruit in approaching directions whereby to sever the pit from the fruit, each of said pitting blades having a relatively large opening formed in its side wall, the opening conforming generally to the maximum curvature of the pit whereby to permit said pit to project through the opening in each of said blades during the pitting action.

27. A pitting blade comprising a flat drop forging of substantially rectangular shape having projecting from one side thereof an extension bulging laterally and arcuately and generally conforming in shape to the maximum curvature of a pit of a peach, the bottom portion of said curved portion being formed with a cutting edge, and said bulging portion being provided with an aperture of sufficient size to permit a portion of the peach pit to project therethrough.

28. A pitting blade comprising a flat drop forging of substantially rectangular shape having projecting from one side thereof an extension bulging laterally and arcuately and generally conforming in shape to the maximum curvature of a pit of a peach, the bottom portion of said curved portion being formed with a cutting edge and the bottom edge of said bulging portion being provided with one or more points disposed in the same plane of the curved portion of the blade.

29. In a device of the class described, the combination of a half fruit holder adapted to receive and hold a half fruit therein with its cut face uppermost and with its pit section exposed and unsevered therefrom, a pitter carriage mounted to reciprocate above the fruit holder toward and from the fruit holder in a vertical direction, a support on said carriage, a presser plate vertically shiftable on said support and adapted in one position to be contacted with the cut face of the half fruit, said presser plate having an aperture therein of cross section greater than the cross section of the pit, a pair of pitter blades shiftably mounted on the frame and adapted to be positioned on opposite sides of the pit when the presser plate contacts with the cut face of the half fruit, means for shifting said pitter blades to cause them to cut into the flesh of the fruit on opposite sides of the pit and arcuately to move downwardly along the under side of the pit in approaching direction, and means for lifting the frame and pitter blades vertically upwardly during a portion of the arcuate movement of the pitter blades while maintaining the presser plate in contact with the cut face of the half fruit whereby the weight of the presser plate serves to exert a force downwardly on the flesh alone of the cut fruit while the pitter blades in their cutting movement around the under side of the pit are moving upwardly, whereby to cause the pitting blades to cut more closely to the curved walls of the pit.

RAYMOND L. EWALD.
HENRY A. SKOG.